(12) United States Patent
Hu et al.

(10) Patent No.: US 6,740,406 B2
(45) Date of Patent: May 25, 2004

(54) COATED ACTIVATED CARBON

(75) Inventors: Sheng-Hsin Hu, Appleton, WI (US); Ronald Lee Edens, Appleton, WI (US); Jeffrey Dean Lindsay, Appleton, WI (US); Thomas Gerard Shannon, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 47 days.

(21) Appl. No.: 09/738,103

(22) Filed: Dec. 15, 2000

(65) Prior Publication Data

US 2002/0110689 A1 Aug. 15, 2002

(51) Int. Cl.⁷ .......................... D02G 3/00; B32B 27/00; B32B 15/02; B32B 17/02; B32B 19/00; B32B 21/02; B32B 23/02; B32B 27/02
(52) U.S. Cl. ...................... 428/403; 428/373; 428/378; 428/394; 428/407
(58) Field of Search ................. 428/375, 378, 428/394

(56) References Cited

U.S. PATENT DOCUMENTS

| | | | |
|---|---|---|---|
| 2,690,415 A | 9/1954 | Shuler | |
| 2,799,241 A | 7/1957 | Wurster | |
| 3,089,824 A | 5/1963 | Wurster | |
| 3,117,024 A | 1/1964 | Ross | |
| 3,196,827 A | 7/1965 | Wurster et al. | |
| 3,207,824 A | 9/1965 | Wurster et al. | |
| 3,241,520 A | 3/1966 | Wurster | |
| 3,253,944 A | 5/1966 | Wurster | |
| 3,676,242 A | 7/1972 | Prentice | |
| 3,692,618 A | 9/1972 | Dorschner et al. | |
| 3,731,678 A * | 5/1973 | Pyzel ......................... | 128/147 |
| 3,855,046 A | 12/1974 | Hansen et al. | |
| 3,919,369 A * | 11/1975 | Holden ...................... | 264/45.1 |
| 3,940,426 A | 2/1976 | Itatani et al. | |
| 4,069,297 A | 1/1978 | Saito et al. | |
| 4,153,745 A * | 5/1979 | Hart ........................... | 427/244 |
| 4,268,417 A | 5/1981 | Messer | |
| 4,285,831 A | 8/1981 | Yoshida et al. | |
| 4,289,513 A | 9/1981 | Brownhill et al. | |
| 4,406,813 A | 9/1983 | Fujishima et al. | |
| 4,504,549 A | 3/1985 | Pines et al. | |
| 4,525,410 A | 6/1985 | Hagiwara et al. | |
| 4,536,553 A | 8/1985 | Rufer et al. | |

(List continued on next page.)

FOREIGN PATENT DOCUMENTS

| | | |
|---|---|---|
| CN | 1158877 | 9/1997 |
| EP | 0 392 528 A2 * | 10/1990 |
| EP | 0 459 003 A1 * | 12/1991 |

(List continued on next page.)

OTHER PUBLICATIONS

Hawley's Condensed Chemical Dictionary, 14$^{th}$ Edition, Richard J. Lewis, Sr., John Wiley & Sons.*

(List continued on next page.)

Primary Examiner—Bruce Hess
Assistant Examiner—Camie S Thompson
(74) Attorney, Agent, or Firm—Pauley Petersen & Erickson

(57) ABSTRACT

Activated carbon particles or fabrics are coated with a deformable or water-insoluble coating material including a binding agent and a masking agent that can be colored. The coating material can provide sufficient diffusivity to permit excellent efficiency in adsorption of materials in spite of the presence of a coating layer on the activated carbon. The use of a deformable binding agent yields coated particles that make relatively less noise when the particles flow or are moved in use, and that have improved tactile properties in use. High performance colored activated carbon materials can be produced and placed in absorbent articles, overcoming common objections about the black color of activated carbon.

63 Claims, 7 Drawing Sheets

U.S. PATENT DOCUMENTS

| | | | |
|---|---|---|---|
| 4,547,317 A | | 10/1985 | Kamhi |
| 4,608,056 A | | 8/1986 | Wilson |
| 4,623,588 A | | 11/1986 | Nuwayser et al. |
| 4,675,140 A | | 6/1987 | Sparks et al. |
| 4,677,019 A | | 6/1987 | von Blucher |
| 4,701,178 A | | 10/1987 | Glaug et al. |
| 4,748,065 A | | 5/1988 | Tanikella |
| 4,762,825 A | | 8/1988 | Takeo et al. |
| 4,764,507 A | | 8/1988 | Takeo et al. |
| 4,795,482 A | | 1/1989 | Gioffre et al. |
| 4,801,445 A | | 1/1989 | Fukui et al. |
| 4,818,614 A | | 4/1989 | Fukui et al. |
| 4,880,858 A | | 11/1989 | Farrar et al. |
| 4,931,360 A | * | 6/1990 | Hoshino et al. ............ 428/328 |
| 4,939,195 A | | 7/1990 | Ishino et al. |
| 4,940,462 A | | 7/1990 | Salerno |
| 4,992,326 A | | 2/1991 | Dabi |
| 5,019,062 A | | 5/1991 | Ryan et al. |
| 5,030,671 A | | 7/1991 | Wehner et al. |
| 5,122,407 A | | 6/1992 | Yeo et al. |
| 5,165,976 A | | 11/1992 | Newing et al. |
| 5,187,287 A | | 2/1993 | Shih |
| 5,254,168 A | | 10/1993 | Littman et al. |
| 5,267,992 A | | 12/1993 | Van Tilburg |
| 5,330,944 A | | 7/1994 | Sherif et al. |
| 5,346,486 A | | 9/1994 | Osborn, III et al. |
| 5,352,807 A | | 10/1994 | Shih |
| 5,364,380 A | | 11/1994 | Tanzer et al. |
| 5,376,198 A | | 12/1994 | Fahrenkrug et al. |
| 5,407,442 A | * | 4/1995 | Karapasha ................. 604/359 |
| 5,480,636 A | * | 1/1996 | Mauro et al. .............. 424/6.21 |
| 5,482,906 A | * | 1/1996 | Sakai et al. ................. 502/402 |
| 5,521,008 A | * | 5/1996 | Lieberman et al. ......... 428/367 |
| 5,536,384 A | | 7/1996 | Thompson et al. |
| 5,538,641 A | | 7/1996 | Getty et al. |
| 5,543,096 A | | 8/1996 | Wu |
| 5,561,167 A | | 10/1996 | Matsumoto et al. |
| 5,571,604 A | | 11/1996 | Sprang et al. |
| 5,625,015 A | | 4/1997 | Brinen et al. |
| 5,633,286 A | | 5/1997 | Chen |
| 5,663,213 A | | 9/1997 | Jones et al. |
| 5,674,212 A | | 10/1997 | Osborn, III et al. |
| 5,685,874 A | | 11/1997 | Buell et al. |
| 5,691,035 A | | 11/1997 | Chappell et al. |
| 5,703,152 A | * | 12/1997 | Ohama ....................... 524/435 |
| 5,709,791 A | | 1/1998 | Hibino et al. |
| 5,712,054 A | | 1/1998 | Kejha |
| 5,713,884 A | | 2/1998 | Osborn, III et al. |
| 5,728,799 A | | 3/1998 | Oh |
| 5,732,718 A | | 3/1998 | Douglas et al. |
| 5,817,229 A | | 10/1998 | Sudhakar et al. |
| 5,834,114 A | | 11/1998 | Economy et al. |
| 5,942,084 A | | 8/1999 | Thompson et al. |
| 5,965,479 A | | 10/1999 | Suzuki et al. |
| 5,981,138 A | | 11/1999 | Suzuki et al. |
| 6,017,831 A | | 1/2000 | Beardsley et al. |
| 6,020,363 A | | 2/2000 | Hirano et al. |
| 6,037,407 A | | 3/2000 | Derian et al. |
| 6,114,081 A | | 9/2000 | Oikawa |

FOREIGN PATENT DOCUMENTS

| | | | |
|---|---|---|---|
| EP | 0 353 010 B1 | * | 7/1994 |
| EP | 0 729 914 A2 | * | 9/1996 |
| EP | 0 557 116 B1 | * | 12/1996 |
| EP | 0 661 094 B1 | * | 12/1997 |
| EP | 0 810 278 A2 | * | 12/1997 |
| EP | 0 811 388 A1 | * | 12/1997 |
| EP | 0 920 817 A2 | * | 6/1999 |
| EP | 0 930 310 A1 | * | 7/1999 |
| EP | 0 725 036 B1 | * | 8/1999 |
| EP | 0 782 400 B1 | * | 12/1999 |
| EP | 1 103 522 A1 | | 5/2001 |
| GB | 2 137 608 A | | 10/1984 |
| JP | 58109135 | | 6/1983 |
| JP | 60204610 | | 10/1985 |
| JP | 02233140 | | 9/1990 |
| JP | 04256436 | | 9/1992 |
| JP | 2000256999 | | 9/2000 |
| WO | WO 91/02711 A2 | * | 3/1991 |
| WO | WO 91/12030 A1 | * | 8/1991 |
| WO | WO 96/05744 A1 | * | 2/1996 |
| WO | WO 96/25225 A1 | * | 8/1996 |
| WO | WO 97/03109 A1 | * | 1/1997 |
| WO | WO 98/15556 A1 | * | 4/1998 |
| WO | WO 98/32915 A1 | * | 7/1998 |
| WO | WO 99/58483 A1 | * | 11/1999 |
| WO | WO 99/62997 A1 | * | 12/1999 |

OTHER PUBLICATIONS

Derwent World Patent Database abstract of JP 02–104,355 A: Description of S. Arakawa, "Nappy With Deodorising Means."

Derwent World Patent Database abstract of JP 54–141,857 A: Description of Uni Charm, "Manufacturing PowderContaining Laminated Sheets."

American Society for Testing Materials (ASTM) Designation: D 2240–97, "Standard Test Method for Rubber Property—Durometer Hardness," pp. 400–403, published Mar. 1997.

Bartzoka, Vasiliki et al., "Silicone—Protein Films: Establishing the Strength of the Protein—Silicone Interaction," *Langmuir*, Mar. 1998, vol. 14, No. 7, p. 1892–1898.

Bartzoka, Vasiliki et al., "Protein—Silicone Synergism at Liquid/Liquid Interfaces," *Langmuir*, May 2000, vol. 16, No. 10, pp. 4589–4593.

Derbyshire, Frank et al., "The Production of Materials and Chemicals from Coal," *American Chemical Society*, Fuel Division, vol. 39, No. 1, Preprints of Papers Presented at the 207th ACS National Meeting, San Diego, CA, Mar. 1994, pp. 113–120.

Horiuchi, Shin et al., "Preparation of Pigment–Polymer Hybrid Particles for Plastic Colorants by Dry–Impact Blending Method," *Journal of Applied Polymer Science*, vol. 74, No. 7, Nov. 14, 1999, pp. 1762–1772.

Huggins, George R. and George Preti, "Vaginal Odors and Secretions", *Clinical Obstetrics and Gynecology*, vol. 24, No. 2, Jun. 1981, pp 355–377.

Sombatsompop, N. and P. Lertkamolsin, "Effects of Chemical Blowing Agents on Swelling Properties of Expanded Elastomers," *Journal of Elastomers and Plastics*, vol. 32, No. 4, Oct. 2000, pp. 311–328.

Van der Vaart, Rick, "Coated Adsorbents for Pressure Swing Adsorption," description of a Ph.D. project of the OSPT–1995–Enschede at web site http://www.ct.utwente.nl/~ospt/minipost95/ut/rick.html.

Young, B. R. et al., "Protein Adsorption on Polymeric Biomaterials: I. Adsorption Isotherms," *Journal of Colloid and Interface Science*, vol. 124, No. 1, Jul. 1988, p. 28–43.

* cited by examiner

COATED ACTIVATED CARBON

BACKGROUND OF THE INVENTION

Activated carbon has long been used for the adsorption of odors and other objectionable compounds. The term "adsorption" generally refers to the preferential partitioning of substances from a gaseous or liquid phase onto the surface of a solid substrate. Adsorption is not the same as absorption, where a liquid being absorbed interpenetrates the absorbing phase. Physical adsorption is believed to be caused mainly by van der Waals forces and electrostatic forces between adsorbate molecules and the atoms which compose the adsorbent surface.

In spite of its excellent properties as an adsorbent, the use of activated carbon in disposable absorbent articles such as diapers or sanitary napkins has been limited by its black color. Activated carbon granules in a pouch may also make unwanted noise or provide an undesirable gritty feel when incorporated into an article worn against the body. What is needed is an improved means of adapting activated carbon for use in absorbent articles or other products wherein the color is changed from black and, optionally, wherein the physical properties of the activated carbon are modified to improve tactile properties or reduce noise or achieve other desirable improvements in the function of the activated carbon material.

SUMMARY OF THE INVENTION

It has been discovered that activated carbon particles can be treated to have arbitrary colors such as green, blue, red, or gold without a significant loss of adsorptive properties. The color of activated carbon can be changed by coating the particles with a coating material comprising a binding agent and a masking agent such as a pigment or dye. The coating material can have sufficient diffusivity or permeability to permit at least one selected odoriferous agent to be adsorbed at an efficiency relative to the uncoated activated carbon of at least 30%, more specifically at least 50%, more specifically still at least 70%, with exemplary ranges of from about 60% to about 95% or from 75% to 100%.

The binding agent can be water insoluble, allowing the coating material and the dye or pigment to remain in place even when the coated activated carbon particles have been wetted. The cured or dried binding agent and/or coating material can also be deformable, having a low degree of hardness to improve the physical properties (e.g., tactile or acoustic properties) of the coated particles when used in an absorbent article. The deformable coating can be elastomeric, comprising an elastomeric binding agent such as a silicone or latex. A silicone binding agent, for example, offers good diffusivity to some odoriferous species such as trimethylamine or ammonia, and can allow the species to be adsorbed almost as efficiently with a colored coating as without the coating. In one embodiment, a non-tacky, elastomeric coating comprising a colored pigment or dye can yield treated particles that flow relatively freely with low noise and that do not feel as rough or gritty as untreated particles when held near the skin in a pouch.

As used herein, the "add-on" level of the coating material is refers to the mass of coating material relative to the mass of the uncoated activated carbon. It is calculated by dividing the mass of the applied coating material (after drying or curing is complete) by the mass of the dry, uncoated activated carbon and multiplying by 100%. The coating material can be applied at an add-on level relative to uncoated activated carbon of greater than about 5%, such as from about 5% to 300%. More specifically, the add-on level can be from about 10% to 250%, more specifically still from about 15% to 200%, more specifically still from about 20% to 100%, and most specifically from about 25% to about 80%. The coating material can comprise up to about 95% by weight masking agent, such as from 5% to 95%, 10% to 80%, 30% to 80%, and 40% to 75%.

The masking agent provides opacity and optionally color to the coating material, and can comprise a mineral such as titanium dioxide (anatase, rutile, or other forms), kaolin, silica, alumina, calcium carbonate, calcium sulfate, calcium bicarbonate, mica, barium sulfate, zinc oxide, magnesium oxide, aluminum trihydroxide, and zirconium oxide, and any known coloring agent such as colored pigments, including C.I. Pigment Green 50, C.I. Pigment Yellow 53, and C.I. Pigment Yellow 28, as well as various lakes (blue lake, red lake, yellow lake, and the like). Inorganic and organic pigments are available from many sources, such as DeltaColors, Inc. (Lawrenceville, Ga.) or BASF Corporation (Mount Olive, N.J.), which produces pigments and colorants under the Sicomet® and Sicovit® trademarks. Inorganic pigments made of minerals can be extracted from earths, fossils, marble or other volcanic and sedimentary rocks in the form of silicates, carbonates, oxides, sulfides and the salt of various metals, such as iron. The masking agent can comprise a white mineral such as titanium dioxide and a dye or colored pigment.

Median particle size of particles in the masking agent, as determined by a Coulter LS100 laser diffraction particle size analyzer manufactured by Beckman Coulter, Inc. (Fullerton, Calif.), can be about 20 microns or less, more specifically about 6 microns or less, and most specifically about 2 microns or less such as less than 1 micron. For example, $TiO_2$ is commonly available in submicron grades having median particles sizes from about 0.25 to about 0.6 microns. Alternatively, masking agent particles can have a Hegman fineness of at least 6 NS (about 25 microns or less), at least 6.5 NS (about 20 microns or less), or at least 7.5 NS (about 6 microns or less). The Hegman gauge indicates the approximate size of the largest particles in a powder and is not directly related to the particle size distribution.

Without wishing to be bound by theory, it is believed that solid particles serving as a masking agent in the coating material can improve transport of odoriferous agents across the coating material (relative to activated carbon coated with a particle-free coating material) by forming micropores or channels for passage of gas to the activated carbon. In a possibly related manner, it is known that microparticles present in a polymeric film can increase the breathability of the film, especially if the film is strained with the particles embedded in it. Particles in the coating liquor may help break up a film as the coating liquor dries or cures, and leave open pores providing access to the surface of the activated carbon. Other adsorption and transport mechanisms may play a role, as well.

Activated carbon materials can be coated using any known suitable method, as described in more detail hereafter. Generally, coating the material comprises a contacting step, in which activated carbon particles or fibers are contacted with a coating liquor that can be a slurry, solution, or resin, and a curing, drying or heating step to remove water from an aqueous emulsion or to remove other liquids, or to permit curing or crosslinking of a resin. For binding agents that cure at room temperature, passage of time may be enough to complete this step, though care should be taken to prevent excessive agglomeration of coated particles by agitation, fluidization, or other means until curing or drying is complete. Once the particles have been coated, they can then be incorporated into any number of absorbent articles using any known process, such as filling a flexible, porous pouch with a quantity of the particles and then incorporating the pouch into a specific region of an absorbent article such as a diaper or ostomy bag.

The activated carbon particles of the present invention can be used in any known application of activated carbon, particularly those in which the activated carbon may be visible. Activated carbon can be beneficially used in absorbent articles such as diapers, incontinence briefs, sanitary napkin, ostomy bags, wound coverings, bed pads, shoe pads, helmet linings, apparel for hunters where suppressing body odor is desirable while in pursuit of game, athletic apparel, and the like. In absorbent articles such as diapers, the activated carbon may be placed in a region likely to be wetted by urine, or may be placed to the sides of such a region to maintain dryness of the activated carbon. Odor control is also a critical need in face masks worn by medical personnel, where activated carbon according to the present invention can be used. Some forms of surgery result in unpleasant odors, as occurs when human tissue is burned by laser or other devices, or when gastrointestinal procedures are necessary. Activated carbon, particularly in the form of thin, flexible fabrics, can play a useful role in eliminating such odors from the air breathed by medical personnel, and can also be used to remove harmful fumes.

The treated activated carbon, either as a fabric, a particulate, or a particulate bonded to a web or film, can be in regions that are likely to remain dry, such as waistbands or leg cuffs, or can be in the absorbent core of the article, where applicable. In sanitary napkins for feminine care, for example, the treated activated carbon material may be directly in the central target zone of the article, or may be disposed toward the longitudinal ends of the article or in lateral wings of the article which are not likely to become wetted. Flaps or wings for sanitary napkins are exemplified in the following patents: U.S. Pat. No. 4,701,178, "Sanitary Napkins with Flaps," issued Oct. 20, 1987 to Glaug et al.; U.S. Pat. No. 5,267,992, issued Dec. 7, 1993 to Van Tilburg; and U.S. Pat. No. 5,346,486, "Sanitary Napkin Having Laterally Extensible Means For Attachment To The Undergarment Of The Wearer," issued Sep. 13, 1994 to Osborn et al.

DETAILED DESCRIPTION OF THE INVENTION

Figure 1A:
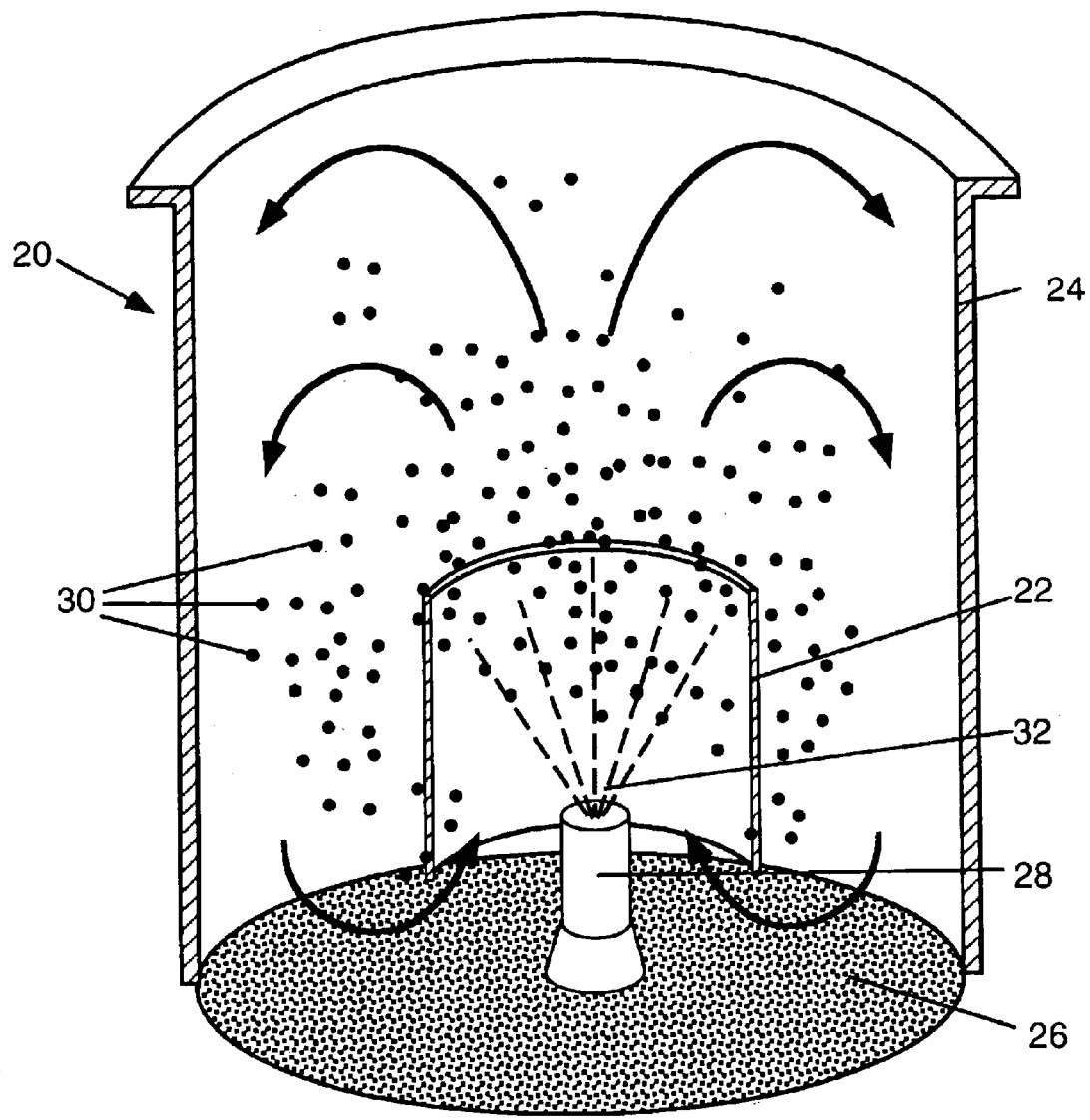
FIGS. 1A and 1B depict a fluidized bed apparatus for applying a coating to activated carbon particles.

Activated carbon in the form of granules, fabrics, fibers, or other forms can be coated with deformable materials such as silicone compounds or other materials, optionally combined with pigment particles, to reduce the black appearance of the activated carbon without significant reduction in the adsorption efficiency of odoriferous agents or other chemicals. The coating material comprises a binding agent (generally a polymeric material) and a masking agent (e.g., an opacifying agent or a colored pigment) to mask the black color of the activated carbon. The coating material can be applied, for example, as a liquid or slurry (a coating liquor) and subsequently dried or cured, or can be applied as dry particles that adhere to or fuse with the activated carbon, or can be applied by other known methods. Any known coating method can be used, such as pan coating, spray-pan coating, fluidized bed coating, and the like. In pan coating systems, coating liquors are deposited by successive spraying as particles tumble in a rotating pan. Coating can also be achieved by spraying the coating liquor onto particles as they are agitated on a screen, falling through a chamber, or stirred in a vat, which can also be fluidized continuously or periodically. Particles can also be conducted through a shower or falling curtain of the coating liquor, wherein the particles are conducted by the motion of a wire or belt, or wherein the particles are blown through the shower or curtain.

Methods for coating webs of activated carbon, such as activated carbon fabrics or webs impregnated with activated carbon, can be adapted from known technologies for coating textile, paper, or nonwoven webs, include slot coaters, blade coaters, spray coaters, and the like. One or both surfaces of the fabric may be coated with the coating liquor by methods such as curtain coating, gravure printing, spray application, cast coating, nip coating, painting with a brush, electrostatic attachment, and so forth. A device for coating a web with particles or a slurry comprising particles is disclosed in U.S. Pat. No. 6,017,831, issued Jan. 25, 2000 to Beardsley et al., herein incorporated by reference.

A coating operation can be carried out by use of a fluidized bed, in which a gas stream fluidizes or entrains activated carbon particles while droplets of the coating liquor in liquid or slurry form are introduced with the activated carbon particles, typically resulting in a substantially uniform coating applied to the particles.

A wide variety of fluidized bed coating systems can be adapted to coat activated carbon particles with a material that enhances the properties of the activated carbon. For example, one can use a Wurster Fluid Bed Coater such as the Ascoat Unit Model 101 of Lasko Co. (Leominster, Mass.), the Magnacoater® by Fluid Air, Inc. (Aurora, Ill.), or the modified Wurster coater described in U.S. Pat. No. 5,625,015, issued Apr. 29, 1997 to Brinen et al., herein incorporated by reference. Wurster fluidized bed coating technology, one of the most popular methods for particle coating, was originally developed for the encapsulation of solid particulate materials such as powders, granules, and crystals, but according to the present invention, can be adapted to deliver a deformable opaque or colored coating to activated carbon, including an elastomeric coating. The coater is typically configured as a cylindrical or tapered vessel (larger diameter at the top than at the bottom) with air injection at the bottom through air jets or a distributor plate having multiple injection holes. Particles are fluidized in the gaseous flow. One or more spray nozzles inject the coating material initially provided as a liquid, slurry, or foam at a point where good contact with the moving particles can be achieved. The particles move upwards and descend behind a wall or barrier, from whence the particles can be guided to again enter the fluidized bed and be coated again, or can be removed and further processed. Elevated air temperature or the application of other forms of energy (microwaves, infrared radiation, electron beams, ultraviolet radiation, steam, and the like) causes drying or curing of the coating material on the particles. The particles can be recycled through the fluidized bed a plurality of times to provide the desired amount of coating on the particles.

The original Wurster fluid bed coaters are described in U.S. Pat. No. 2,799,241, issued Jul. 16, 1957 to D. E. Wurster; U.S. Pat. No. 3,089,824, issued May 14, 1963 to D. E. Wurster; U.S. Pat. No. 3,117,024, issued Jan. 7, 1964 to J. A. Lindlof et al.; U.S. Pat. No. 3,196,827, issued Jul. 27, 1965 to D. E. Wurster and J. A. Lindlof; U.S. Pat. No. 3,207,824, issued Sep. 21, 1965 to D. E. Wurster et al.; U.S. Pat. No. 3,241,520 issued Mar. 21, 1966 to D. E. Wurster and J. A. Lindlof; and U.S. Pat. No. 3,253,944, issued May 31, 1966 to D. E. Wurster; all of which are herein incorporated by reference. More recent examples of the use of Wurster coaters are given in U.S. Pat. No. 4,623,588, issued Nov. 18, 1986 to Nuwayser et al., herein incorporated by reference. A related device is the coater of H. Littman disclosed in U.S. Pat. No. 5,254,168, "Coating Apparatus Having Opposed Atomizing Nozzles in a Fluid Bed Column," issued Oct. 19, 1993, herein incorporated by reference.

Other coating methods need not rely on particle fluidization in a gas stream. Particles can be sprayed or treated with a coating material while being mechanically agitated by a shaker or other pulsating device, while falling from one container to another, while tumbling in a moving vessel or a vessel with rotating paddles such as a Forberg particle coater (Forberg AS, Larvik, Norway) which can be operated without applied vacuum to keep the coating material on the surface of the activated carbon, or while resting in a bed, after which the particles are separated or broken up. In one embodiment, particles and a coating liquid or slurry are first combined and then the particles are separated into individually coated particles by centrifugal forces, as disclosed in U.S. Pat. No. 4,675,140, issued Jun. 23, 1987 to Sparks et al., herein incorporated by reference.

Systems for coating dry particles can also be adapted for coating activated carbon according to the present invention. Examples of such equipment include:

Magnetically Assisted Impaction Coating (MAIC) by Aveka Corp. (Woodbury, Minn.), wherein magnetic particles in a chamber are agitated by varying magnetic fields, causing target particles and coating materials to repeatedly collide, resulting in the coating of the target particles;

Mechanofusion by Hosokawa Micron Corp. (Hirakata, Osaka, Japan), wherein particles and coating materials in a rotating drum are periodically forced into a gap beneath an arm pad, causing the materials to become heated and joined together to form coated particles, a process that is particularly effective when a thermoplastic material is involved;

the Theta Composer of Tokuju Corporation (Hiratsuka, Japan), wherein particles and coating material are mechanically brought together by a pair of rotating elliptical heads;

Henschel mixers from Thyssen Henschel Industritechnik (Kassel, Germany), believed to be useful for combining particles with polymeric materials;

the Hybridizer of Nara Machinery (Tokyo, Japan), which employs blades rotating at high speed to impact a coating powder onto particles carried by an air stream; and the Rotary Fluidized Bed Coater of the New Jersey Institute of Technology, which comprises a porous rotating cylinder with particles inside. Pressurized air enters the walls of the cylinder and flows toward a central, internal exit port. Air flow through the walls of the chamber can fluidize the particles, acting against centrifugal force. As the particles are fluidized, a coating material injected into the chamber can impinge upon the particles and coat them.

With dry particle coating, the activated carbon particle may first be coated with a deformable material by any technique, and then subsequently coated with a dry masking agent in powder form. Doing so creates a coating material in which the masking agent is selectively distributed near the exterior surface of the coating material, and in which the portion of the coating material next to the activated carbon particle itself can be substantially free of masking agent. The deformable material coated onto the activated carbon can hold the dry particles in place, after they are joined to the deformable material, so the deformable material serves as a binding agent. Alternatively, the activated carbon particle may first be coated with the masking agent using any of the above dry coating methods, and then a binding agent such as a transparent or translucent water-insoluble material may be applied over the masking agent by any means. In the latter case, the masking agent is selectively distributed toward the surface of the activated carbon particle.

The coating liquor may be an aqueous emulsion, such as a silicone emulsion or a latex emulsion. The coating liquor may further comprise a porosity promoter such as a physical or chemical blowing agent; nonwetting particles; hollow microspheres such as the cross-linked acrylate Sun-Spheres™ of ISP Corporation (Wayne, N.J.) and the related hollow spheres of U.S. Pat. No. 5,663,213, herein incorporated by reference; expandable spheres such as Expancel® microspheres (Expancel, Stockviksverken, Sweden, a division of Akzo Nobel, Netherlands), and the like. The use of blowing agents to create porosity in deformable materials, particularly elastomers, is well known and is described by N. Sombatsompop and P. Lertkamolsin in "Effects of Chemical Blowing Agents on Swelling Properties of Expanded Elastomers," *Journal of Elastomers and Plastics*, Vol. 32, No. 4, October 2000, pp. 311–328, herein incorporated by reference. Useful blowing agents can include ammonium carbonate, azodicarbonamide (ADC), oxybisenzenesulphonylhydrazide (OBSH), and release gas mixtures of nitrogen, carbon dioxide, carbon monoxide, ammonia and water.

Figure 1B:
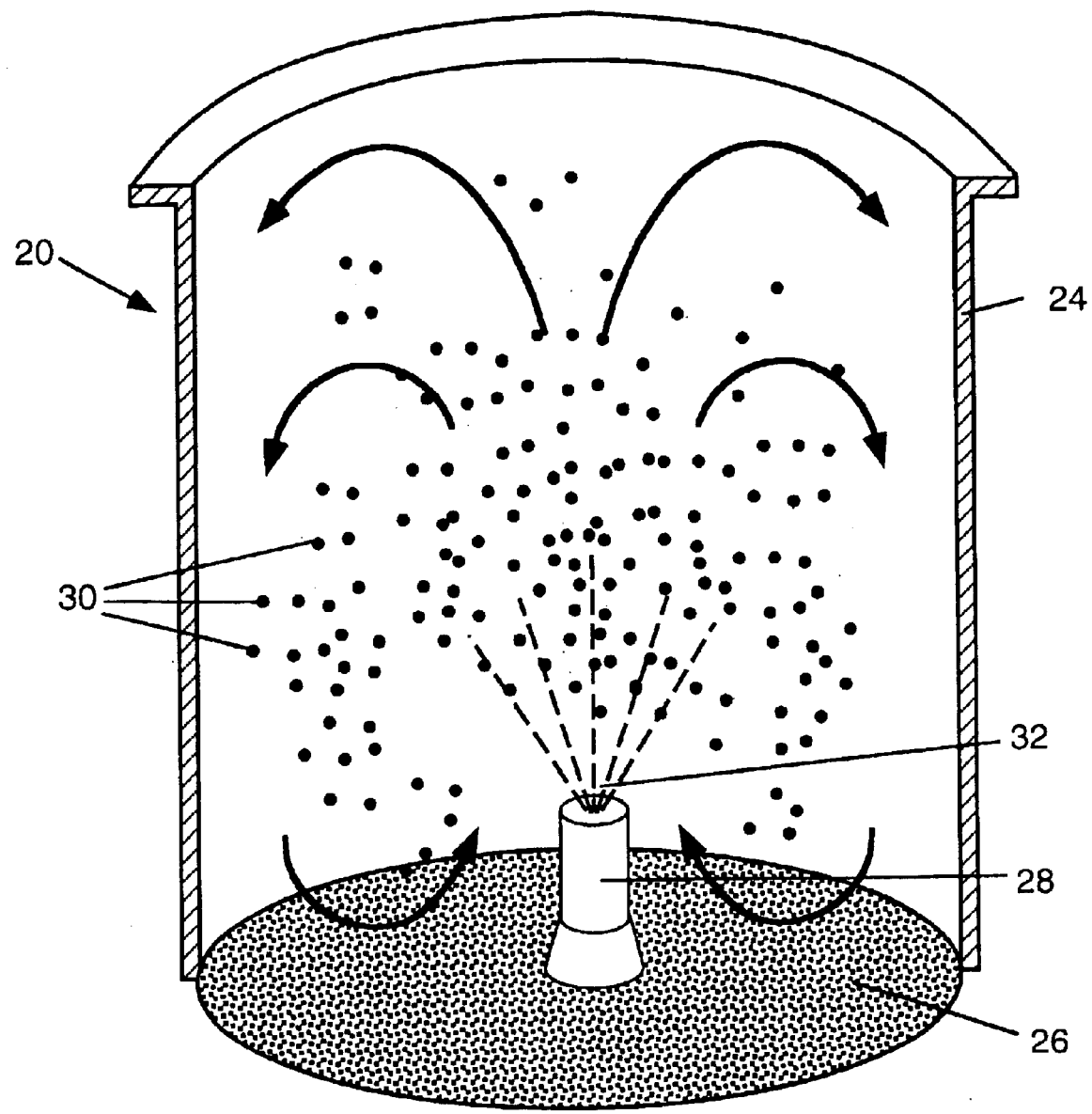

By way of example, FIGS. 1A and 1B illustrate two versions of a fluidized bed coating process that can be used to coat particles according to the present invention. In FIG. 1A, the depicted apparatus 20 comprises an inner cylindrical partition 22, an outer cylindrical partition 24, and a distributor plate 26 having a central porous or sintered region for injection of gas to entrain particles. The majority of the fluidizing gas flow is directed through the inner cylindrical partition 22. Thus, the general flow pattern of the particles 30 is upward inside the inner cylindrical partition 22, and downward outside the inner cylindrical partition 22. Unlike several common versions of the Wurster process, in the apparatus 20 of FIG. 1A, the spray nozzle 28 is located at the bottom of the apparatus 20, just above the distributor plate 26. The nozzle 28 sprays upward, providing a cocurrent application of a coating liquor spray 32 to the particles. Any suitable spray nozzle and delivery system known in the art can be used.

FIG. 1B is similar to FIG. 1A except that the inner cylindrical partition 22 of FIG. 1A has been removed, and the porous or sintered region of the distributor plate 26 now substantially extends over the entire distributor plate 26.

Many aspects of the apparatus in FIG. 1A can be modified within the scope of the present invention. For example, the inner cylindrical partition 22 may be replaced with one or more baffles or flow guides (not shown). The walls of either the outer cylindrical partition 24 or inner cylindrical partition 22 may be tapered and may be interrupted with ports or openings for removal or particles or addition of coating material from one or more spray nozzles (not shown). Either the outer cylindrical partition 24 or the inner cylindrical partition 22 or both may rotate, vibrate, or oscillate. The distributor plate 26 may also move during the coating operation (e.g., vibrate, rotate, or oscillate). A variety of spray nozzles and delivery systems can be applied to deliver the coating material, including the Silicone Dispensing System of GS Manufacturing (Costa Mesa, Calif.). Coating material can be applied by spraying from any position in the apparatus 20, or by curtain coating or slot coating or other processes applied to a moving stream of activated carbon particles.

Figure 2:
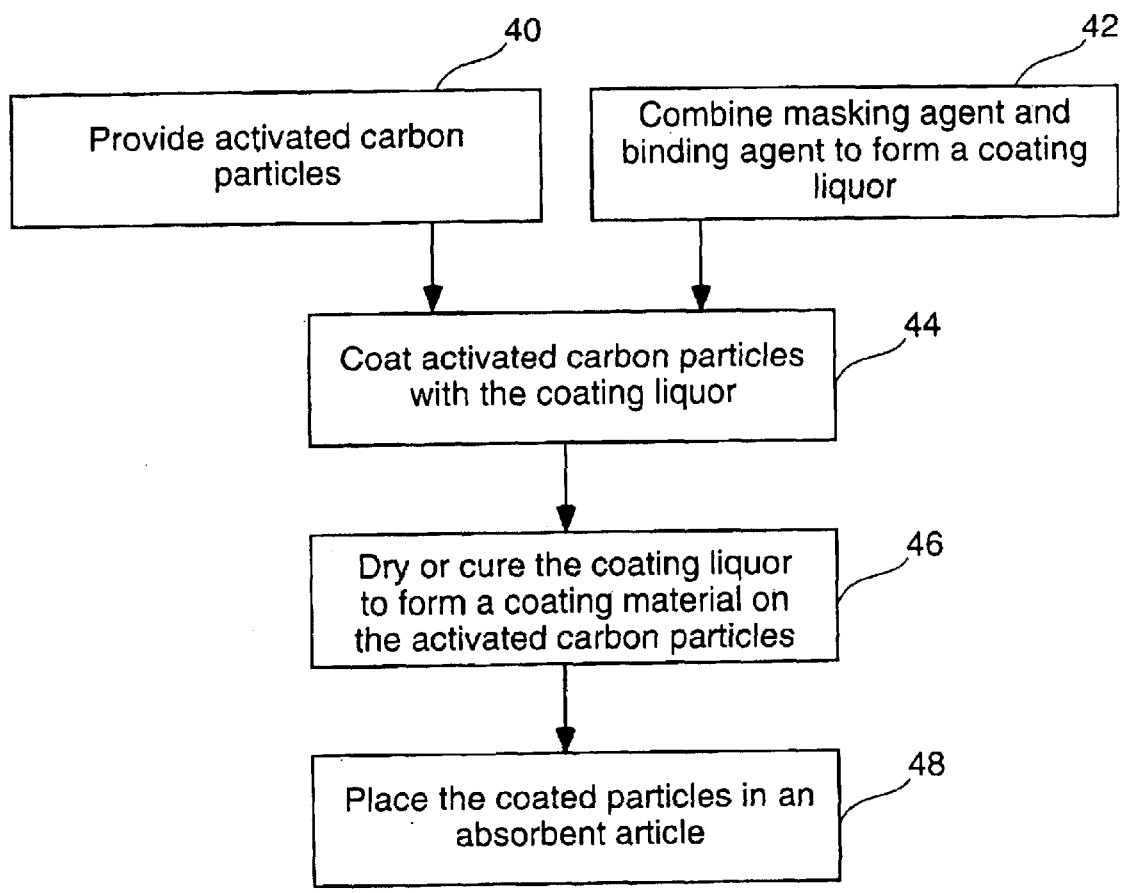
FIG. 2 is a flowchart depicting one embodiment of operations to create activated carbon particles with a pigmented coating.

FIG. 2 depicts a flowchart showing one method of producing activated carbon particles according the present invention. Activated carbon particles are provided 42 and a masking agent and binding agent are combined to form a coating liquor 44, typically in the form of a slurry. The particles and the coating liquor are then combined in a coating step 44 to coat the particles, during or after which the coating liquor on the particles is allowed to dry or cure to form a coating material on the activated carbon particles 46, a process which can include heating by any known method, such as application of heated air or steam, infrared radiation, microwave radiation, inductive heating, and the like. The coated particles can then be incorporated into an absorbent article 48.

FIGS. 3–6 are discussed below.

Activated Carbon

As used herein, "activated carbon" refers to highly porous carbon having a random or amorphous structure. Granules and pellets of activated carbon are well known, such as the products manufactured by Calgon Carbon, Inc. (Pittsburgh, Pa.), and can be used in the present invention. Activated carbon from any source can be used, such as that derived from bituminous coal or other forms of coal, or from pitch, coconut shells, corn husks, polyacrylonitrile (PAN) polymers, charred cellulosic fibers or materials, wood, and the like. Activated carbon particles can, for example, be formed directly by activation of coal or other materials, or by grinding carbonaceous material to a fine powder, agglomerating it with pitch or other adhesives, and then converting the agglomerate to activated carbon.

The activated carbon also can be in the form of a fabric, woven or nonwoven; a foam impregnated with activated carbon, and other activated carbon containing materials that form an integral structure such as a web or layer. Activated carbon fabrics of use in the present invention include woven or nonwoven materials such as those made from carbon fibers and those made by carbonizing an cloth or web comprising fibers such as cellulosic fibers, fibers formed from phenolic resins, fibers formed by polyacrylonitrile (PAN), and the like. Another useful class of activated carbon fabrics include those made by adding activated carbon to the surface of an existing fabric. This can be done by adhering activated carbon particles to a web, or by producing activated carbon in situ on a web by the method disclosed in U.S. Pat. No. 5,834,114, "Coated Absorbent Fibers," issued Nov. 10, 1998 to Daley and Economy, herein incorporated by reference in its entirety. Daley and Economy disclose a temperature resistant base fabric such as a fiberglass fabric which is impregnated with a resin such as a novolac resin that is subsequently crosslinked, charred and then activated in a controlled atmosphere to produce a coating of activated carbon on the fibers of the fabric. Such a process can create soft, flexible activated carbon fabrics. Daley and Economy also disclose gaseous treatment of the activated carbon during an activating step to add a variety of functional groups to the activated carbon surface, such as nitrogen groups to provide good adsorption of acidic materials.

Among the many means of producing activated carbon materials are those methods disclosed in U.S. Pat. No. 5,834,114, previously incorporated by reference; and U.S. Pat. No. 4,285,831, issued Aug. 25, 1981 to Yoshida et al.; U.S. Pat. No. 4,677,019, "Carbon-Containing Protective Fabrics," issued Jun. 30, 1987 to von Blucher; U.S. Pat. No. 4,069,297, issued Jan. 17, 1978 to Saito et al.; and U.S. Pat. No. 5,561,167, "Anti-bacterial Fiber, Textile and Water-Treating Element Using the Fiber and Method of Producing the Same," issued Oct. 1, 1996 to Matsumoto et al., all of which are herein incorporated by reference. Further principles and methods are disclosed by F. Derbyshire et al., "The Production of Material and Chemicals from Coal," Amer. Chem. Soc., Fuel Division, Preprints, Vol. 39, pp. 113–120, 1994.

In one embodiment, the activated carbon is provided with functional groups to modify the surface properties of the product. For example, during the activation stage, the carbon can be exposed to hydrogen chloride to add chlorine groups, to oxygen or water vapor to add oxygen or hydroxyl groups, to ammonia to add amine groups, to hydrogen to add hydrogen, and so forth. Alternatively, a compound such as a non-gaseous molecule may be added to the carbon prior to activating it or prior to a post-treatment step, wherein the compound reacts at elevated temperature to add functional groups to the activated carbon. Such a process is described, for example, in U.S. Pat. No. 5,521,008, issued May. 28, 1996 to Lieberman et al., herein incorporated by reference. Lieberman discloses pre-treating a carbonized fibrous material, such as a carbonized cellulose fiber, with a solution of nitrogen-containing compound, comprising at least one of the following substances: urea, ammonium carbonate, ammonium bicarbonate, ammonium acetate, and other organic salts of ammonia such as formate, carbamate, citrate and oxylate, and activating the pre-treated carbonized material at 800° C. to 1200° C. in an atmosphere comprising steam and/or carbon dioxide until a high degree of activation is produced. The activated carbon fiber material is said to be amphoteric, wherein both acidic and basic functional groups are present on its surface.

Activated carbon in any form can also be impregnated with other materials to increase the adsorption of specific species. For example, activated carbon impregnated with citric acid can be used to increase the ability of activated carbon to adsorb ammonia. Impregnation with sodium hydroxide or other caustic compounds can be useful for removal of hydrogen sulfide. Impregnation with metals or metal ions such as copper sulfate and copper chloride is believed to be useful for removal of other sulfur compounds. Other modified activated carbon materials can be used, such as Centaur Carbon® from Calgon Carbon, which is believed to have reduced nitrogen groups on the surface, or the Minotaur® series of activated carbons, also from Calgon Carbon, which is believed to be suited for removal of several compounds comprising metals. Activated carbon may also be impregnated with a variety of salts, such as zinc salts, potassium salts, sodium salts, silver salts, and the like.

The Binding Agent

The binding agent can hold pigment or other color-masking additives on the activated carbon to hide the black color and/or can provide other useful physical properties as well. To maintain the color or other physical properties of the modified activated carbon after the article has been wetted with body fluids, the binding agent can be insoluble in water, though water-soluble binding agents can be within the scope of the present invention. In one embodiment, the binding agent is hydrophobic. The binding agent can be deformable, having a Shore A hardness of about 90 or less, more specifically about 70 or less, more specifically still about 50 or less, and most specifically about 35 or less. Shore A hardness can be measured using the standard test method ASTM D2240, which requires a sample thickness of at least 6 mm and specifies the method of using a specific durometer device for Type A hardness readings.

In one embodiment, the binding agent is an elastomer such as a silicone elastomer, polyurethane rubber, polybutadiene, polyacrylate elastomers, fluroelastomers such as polyvinyl fluoride and polyvinylidene fluoride, nitrile rubber, butyle rubber, chloroprene rubber, and isoprene rubber. Useful silicone elastomers are exemplified by a variety of Dow Corning® silicone compounds, particularly silicone latexes, such as Dow Corning® 84 Additive (Dow Corning Corporation, Midland, Mich.). Silicone in the form of uncured caulking compounds or pourable mixtures can be used. Other suitable elastomers include Santoprene® Thermoplastic Rubber such as Santoprene® 171-55, manufactured by Advanced Elastomer Systems (Akron, Ohio). Also of use are the elastomers sold under the trade names of Vyram® and Sefsin®, also manufactured by Advanced Elastomer Systems (Akron, Ohio); Smooth-Sil® silicone rubbers (condensation-cure or addition-cure rubbers) such as Smooth-Sil® 950 manufactured by Smooth-On, Inc. (Easton, Pa.); Brush-On 50, a polyurethane rubber with a Shore A hardness of 50 and Clear-Flex 50, a liquid rubber compound also with a Shore A hardness of 50, both produced by Smooth-On, Inc. (Easton, Pa.); and the Zero Gel polyurethane elastomers of Cementex, Inc., which cure at room temperature. According to manufacturer specifications, Zero Gel 11 has a Shore A hardness of 50, while that of Zero Gel 123 is 30, of Zero Gel 21 is 45, and of Zero Gel 12 is 70. The organopolysiloxanes of U.S. Pat. No. 6,037,407, issued Mar. 14, 2000, herein incorporated by reference, can also be of use.

Two-part silicone (siloxane) room-temperature vulcanizable (RTV) rubber compositions are well known in the art. Both addition-type and condensation-type cure mechanisms are known to convert the generally pourable components into cross linked elastomeric systems. Systems can also be used wherein no catalyst is required for the cure, such as the system comprising an amine-functional organopolysiloxane and an acrylfunctional organopolysiloxane as disclosed in U.S. Pat. No. 4,698,406, issued Oct. 6, 1987 to Lo et al., herein incorporated by reference.

Silicone binding agents can also include methyl-phenyl polysiloxane, other organopolysiloxanes, flexible methyl silicone binders, or any of the silicone systems disclosed in the following patents: U.S. Pat. No. 5,165,976, issued Nov. 24, 1992 to Newing et al.; U.S. Pat. No. 4,504,549, issued Mar. 12, 1985 to Pines et al.; and U.S. Pat. No. 4,536,553, issued Aug. 20, 1985 to Rufer et al., all of which are herein incorporated by reference.

A variety of non-silicone latex compounds can also be used, including natural latex and synthetic latex, though in some embodiment, it is desired that the coating material be free of natural latex, or free of latex altogether. Useful latex compounds can include emulsions of poly(ethylene-vinyl acetate), poly(styrene-butadiene), poly(styrene-acrylic), vinyl acrylic terpolymers, neoprene, polyesters, acrylics, poly vinyl chloride, ethylene-vinyl chloride copolymer, carboxylated vinyl acetate, and the like, all of which can be non-crosslinking (e.g., devoid of N-methylol acrylamide or other crosslinkers), crosslinking, or potentially crosslinking (i.e., prepared with a crosslinker present).

In general, a latex emulsion can be coated onto activated carbon particles or fabric and then allowed to cure or dry, which may include heating. The emulsion can comprise fine pigment particles or other coloring agents. Other compounds can be applied in uncured, liquid or slurry form, and then cured with the appropriate curing method.

Other binding agents can include gelatinous elastomeric materials, such as those disclosed in U.S. Pat. No. 5,633,286, issued May 27, 1997 to J. Y. Chen, herein incorporated by reference.

Silicone materials, such as silicone elastomers, have been found to adsorb proteins (see B. R. Young, W. G. Pitt, and S. L. Cooper, *J. Colloid Interface Science*, 1988, Vol. 124, p. 28). In one embodiment where proteins from menses or other body fluids are adsorbed on the silicone-coated particles, protein adsorption is enhanced by the presence of functional groups in the silicone such as (triethoxysilyl) propyl groups (see V. Bartzoka, M. A. Brook, and M. R. McDermott, *Langmuir*, 1998, vol. 14, p. 1892 and V. Bartzoka, G. Chan, and M. A. Brook, *Langmuir*, 2000, Vol. 16, pp. 4589–4593).

Odoriferous Agents

As used herein, an "odoriferous agent" can include compounds associated with body fluids that are known to cause unpleasant odors, and can include other sources of malodor. Specifically, odoriferous agents can include ammonia; isovaleric acid; methyl, diethyl, triethyl and n-butyl amines; butyric acid; butyraldehyde; formaldehyde; acetaldehyde; toluene; benzene; furaldehyde; furfural; pyridine; di-n-propyl sulfide; indole; skatole (also known as 3-methylindole); ethyl mercaptan; and methyl mercaptan, any one of which can be used to test the adsorption efficiency (hereafter defined) of coated activated carbon.

Other agents can also be used in testing adsorption efficiency, including hydrogen chloride, hydrogen cyanide, hydrogen sulfide, carbon disulfide, dimethyldisulfide, dimethyltrisulfide, phosgene, chlorine, bromine, and the like.

Hunter Color Measurement

The color of particulates can be characterized using the HunterLab Color Scale of Hunter Associates Laboratory, Reston, Va., U.S.A. The scale has three parameters, L, a, and b. "L" is a brightness value, "a" is a measure of the redness (+a) and greenness (−a), and the "b" value is a measure of yellowness (+b) and blueness (−b). For both the "a" and "b" values, the greater the departure from 0, the more intense the color. "L" ranges from 0 (black) to 100 (highest intensity). The treated activated carbon of the present invention can have an "L" value of about 40 or greater, more specifically about 60 or greater, more specifically still about 80 or greater, and most specifically about 85 or greater. While the treated activated carbon can be substantially white or gray in color, in one embodiment the color is noticeably colored, having at least one of the "a" and "b" values having an absolute value that is greater than one of the following values: 8, 12, 15, 20, 25, 30, and 35. For example, the absorbent value of either "a" or "b" may fall in the range of from 10 to 25, or from 15 to 32. By way of example, the particles may be green or greenish, and in one embodiment could be characterized by having an L value of 55 or greater, an "a" value from −15 to −65, and a "b" value from 6 to 28. In another embodiment, the particles may be bluish or violet, having an L value of 50 or greater, an "a" value from −35 to 15, and a "b" value from −10 to −35.

Measurement of particles or fabrics to obtain HunterLab L-a-b values is done with a Technibryte Micro TB-1C tester manufactured by Technidyne Corporation, New Albany, Ind., U.S.A. The particles are spread evenly in a flat layer at least 2 mm deep, sufficient to block the appearance of the black surface on which the particles are spread.

Particulate Noise Level Test

The relative quietness of various activated carbon particles can be assessed with a sound meter that measures the noise made by a quantity of particles falling onto a surface from a predetermined height. The Particulate Noise Test is conducted with a ZEFON® Digital Sound Level Meter, Model 407750, manufactured by Zefon International, 2860 23$^{rd}$ Avenue North, St. Petersburg, Fla. 33713. The meter comprises a plastic body, a microphone housed in a metallic cylinder projecting from the body, and a spherical foam cover to protect the microphone. The test is conducted in an environment at 70–73° F. and a relative humidity of about 30%.

Figure 3:
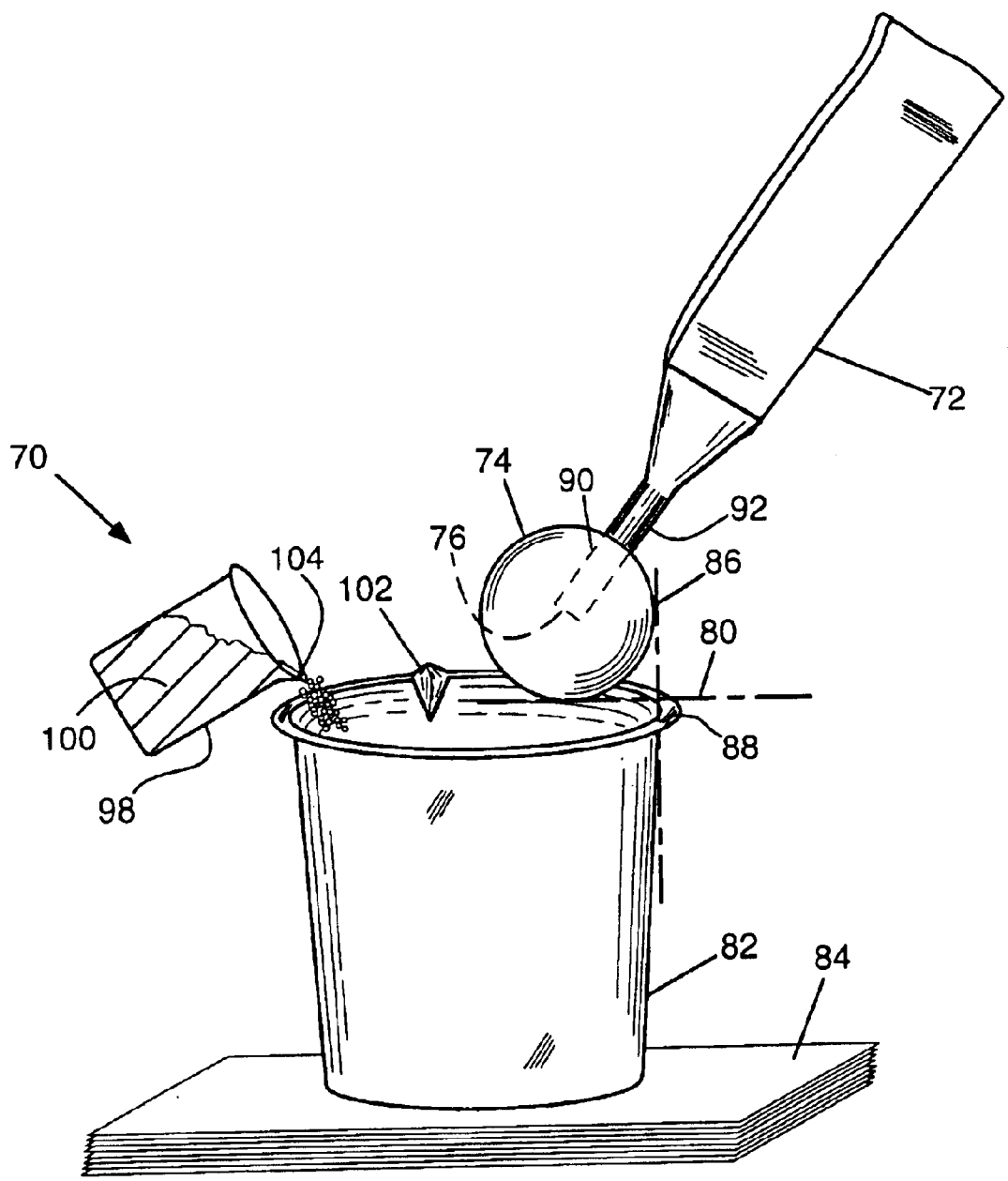
FIG. 3 depicts the experimental equipment used for the Particulate Noise Level test.

FIG. 3 depicts the set up of the apparatus 70. A sound meter 72 is held by a clamp (not shown) at an angle of 55 degrees from horizontal. A spherical foam cover 74 (provided with the sound meter 72) disposed over the microphone 76 at the end of the sensor rod 92 as shown has a lower boundary in the same plane as the rim 88 of a NALGENE® 1201-0600 600 ml polypropylene jar 82 that rests on a level stack of KLEENEX® facial tissues 84 about 25 mm thick, intended to dampen vibrations. Thus, an imaginary horizontal line 80 that is tangent to the lower surface of the foam cover 74 is also tangent to the rim 88 of the jar 82. An imaginary vertical line 86 projecting upwards from the wall of the container immediately below the rim is tangent to the back surface of the foam cover 74, as shown. The foam cover 74 has a diameter of about 6.6 centimeters and has a cylindrical central hole 90 just wide enough to accommodate the tip of the sensor rod 92 where the microphone 76 is housed. The hole 90 is about 33 millimeters deep. Once the sound meter 72 is positioned with the microphone 76 over the top of the container, the sound meter 72 is turned on (running off batteries) and is set to "slow" mode (for a degree of time averaging of the response) with "Type A" sound weighting, which simulates the hearing of the human ear. The "Maxhold" function is turned on which displays the peak sound level reading. Over a 10 second interval, the peak sound level from background noise should not exceed 37 decibels to ensure that background noise is not significantly affecting sound level readings for the Particulate Noise Test.

A 100 ml KIMAX® glass beaker 98, No. 14000, is used to hold and pour 60 cc of particles 100 to be tested. The beaker 98 partially filled with particles 100 is held such that the lip of the spout 104 of the beaker 98 is 10 mm above the edge of the plastic container 82, such that a vertical plane passing through the midpoint of the sound meter 72 and the microphone 76 would also bisect the glass beaker 98. In other words, the microphone 76 is positioned over one portion of the plastic container 82, and the beaker 98 is held next to the opposing portion of the plastic container 82. The spout 102 on the plastic container 82 is rotated to be 90 degrees away from the vertical plane that passes through the centers of the sound meter 72 and the glass beaker 98. To perform the measurement, while the Maxhold setting is on, the contents of the glass beaker 98 are poured into the plastic container 82 over a 5-second period by rotating the glass beaker 98 such that the lip of the spout 104 thereof remains at substantially the same location is space as the bottom of the beaker 98 is rotated upwards. The beaker 98 remains centered on the same imaginary vertical plane, meaning that the beaker 98 is not rotated to the left or right relative to an observer holding the beaker 98, the observer's body also being bisected by the imaginary plane that bisects the sound meter 72, the plastic container 82, and the beaker 98. During pouring, care is taken to avoid sudden gushes or slugs of particles 100 being dislodged, striving to maintain a uniform flow rate during pouring. If cohesion between the particles 100 causes nonuniform pouring (a problem that may occur for some elastomeric coatings), a slight shaking motion of the beaker 98 from side-to-side with an amplitude of about 1 cm is permitted if necessary to dislodge particles 100 and promote uniformity in the flow of particles 100.

After pouring the particles 100, the peak sound level is taken from the meter 72, and Maxhold is deactivated until another sample is ready to be tested. For each sample to be tested, the particles 100 are poured and the sound level is measured, repeating the process for a total of seven trials. The maximum and minimum values are then discarded, and the mean and standard deviation of the remaining five values are taken. The resulting mean peak sound level value for a sample measured according to the procedure outlined above is called the Particulate Noise Level (PNL). The Particulate Noise Level depends on the size and density of the base activated carbon particles, but can, for example, range from 42 decibels to 65 decibels. In comparing PNL for activated carbon particles coated with elastomers to untreated particles or particles treated with a non-elastomeric coating or non-deformable coating, PNL can be reduced by about 2 decibels or more, more specifically by about 4 decibels or more, and most specifically by about 6 decibels or more.

Without wishing to be bound by theory, it is believed that a treatment that reduces the PNL value will generally reduce the level of noise generated in an absorbent article by a pouch filled with the activated carbon particles when the pouch is compressed by action from the body of the wearer. It has been observed that simple compression by human fingers of plastic bags filled with treated and untreated activated carbon particles resulted in significant decreases in noise level when the particles had been treated with silicone, and this observed noise reduction was generally consistent with PNL measurements.

Adsorption Efficiency of Treated Activated Carbon

The adsorption efficiency of a specified odoriferous agent can be tested for both treated and untreated activated carbon to yield a Relative Adsorption Efficiency. For example, if a specified mass of uncoated activated carbon can adsorb 100 mg of trimethylamine, and the same mass of coated activated carbon can adsorb 90 mg of trimethylamine, the Relative Adsorption Efficiency of the coated activated carbon is 90% with respect to trimethylamine.

Adsorption testing is done with a headspace gas chromatography (headspace GC) procedure to measure the amount of an odoriferous compound that is removed from the gas phase by activated carbon (coated or uncoated). The headspace GC testing was conducted on a Hewlett-Packard HP5890 GC with a HP7694 Headspace Sampler. A J&W DB-624 column by J&W Scientific Inc. (Folsom, Calif.) with 30 m length, 0.25 mm I.D., and 1.4 micrometer film thickness and a flame ionization detector (FID) were used for analysis of triethylamine (TEA), trimethylamine (TMA), and dimethyldisulphide (DMDS). A FFAP-CB column with 25 m length, 0.32 mm I.D., and 0.3 micrometer film thickness, by Chrompack (The Netherlands), was used for isovaleric acid, and a packed 8 ft by 0.125 inch I.D. 60/80 mesh HayeSep P column from Alltech Associates (Deerfield, Ill.) was used for ammonia.

Operating parameters for the headspace GC as a function of the odoriferous agent being tested are shown in Table 1:

TABLE 1

Operating parameters for the headspace GC device.

| Headspace Parameters | Values | | |
|---|---|---|---|
| | TMA, TEA, DMDS | IVA | $NH_3$ |
| Zone Temps | | | |
| Oven | 37 | 37 | 37 |
| Loop | 85 | 100 | 42 |
| TR, Line | 90 | 105 | 47 |
| Event Time | | | |
| GC Cycle time | 10.0 | 10.0 | 10.0 |
| Vial eq. Time | 10.0 | 10.0 | 10.0 |
| Pressuriz. Time | 0.20 | 0.20 | 0.20 |
| Loop fill time | 0.20 | 0.20 | 0.20 |
| Loop eq. Time | 0.15 | 0.15 | 0.15 |
| Inject time | 0.30 | 0.30 | 0.30 |
| Vial Parameters | | | |
| First vial | 1 | 1 | 1 |
| Last vial | 1 | 1 | 1 |
| Shake | [off] | [off] | [off] |

The settings for isovaleric acid (IVA) can be used for other acidic odoriferous agents. The settings for TMA and TEA can be used for other basic odoriferous agents.

The test procedure involves placing 0.014 g of an activated carbon sample (coated or uncoated) inside a 20-cc headspace vial. Using a syringe, an aliquot of an odoriferous agent is also placed in the vial taking care not to let the liquid and activated carbon come in contact. The vial is then sealed with a cap and septum and placed in the headspace GC oven at body temperature (37° C.). After ten minutes, a hollow needle is inserted through the septum and into the vial. A 1-cc sample of the headspace (air inside the vial) is then injected into the GC. This exposure time of ten minutes to the odoriferous agent applies to all samples tested. Initially a standard vial with only the aliquot of odoriferous agent (no activated carbon) is tested to defined 0% odoriferous agent adsorption. To calculate the amount of headspace odoriferous agent removed by the activated carbon, the peak area for the odoriferous agent from the vial with activated carbon is compared to the peak area from the odoriferous agent standard vial (no activated carbon). Testing is done with about 2 mg of odoriferous agent and 0.014 grams of adsorbent (coated or uncoated activated carbon). For example, using ammonia in a solution at a concentration of about 30%, 6 microliters of the solution are injected into the vial. For triethylamine at a concentration of 40%, 5 microliters of the solution are injected. For substances available at concentrations or purities of about 100%, 2 microliters are injected. Results are presented as "% odor adsorption" and as "mg odor adsorbed/g activated carbon." The ratio of the mg odor adsorbed/g activated carbon for treated and untreated activated carbon is the Relative Adsorption Efficiency for the particular odoriferous agent in question.

Other Additives and Embodiments

The treated activated carbon particles of the present invention can also be used in combination with other odor-control means, such as the anhydrous compositions of Tanzer et al. in U.S. Pat. No. 5,364,380, issued Nov. 15, 1994. Further, cyclodextrin compounds, zeolites, perfumes, encapsulated materials, baking soda, enzyme inhibitors, plant extracts, enzyme sequestrants and inhibitors, clays, and other odor control agents can be used. For example, cyclodextrin compounds and their derivatives can be included in a coating liquor such as a silicone-based liquor, or can be applied with dry coating methods or other forms of contact to the surface of a binding agent already on activated carbon particles.

The activated carbon of the present invention can be further treated or combined with water and/or oil-repelling materials that do not substantially impede the adsorbent properties of the activated carbon. For example, elastomer-coated activated carbon particles may be further coated with a small quantity of a fluorochemical to resist body fluids such as sweat without substantially losing odor-adsorbent performance, as disclosed by J. A. Hart in U.S. Pat. No. 4,153,745, issued May 8, 1979, herein incorporated by reference." Suitable fluorochemicals include those sold under the name Scotchgard® by the 3M Company (Minneapolis, Minn.). Likewise, the treated activated carbon of the present invention may be laminated with or retained by a web treated with a water and/or oil repellant material such as a fluorochemical, sizing agent, silicone, or other known agents.

Clay particles such as bentonite can be added to the coating materials, but in one embodiment the coating material is substantially free of clay. Zeolites and other odor adsorbing material may also be provided in the article or with the activated carbon particles or in combination with the activated carbon particles, though in one embodiment the particles are not attached to zeolite particles, and in another embodiment the article is substantially free of zeolites.

Water soluble polymers such as polyvinyl alcohol or cellulose derivatives can be present in the coating material, but in one embodiment the coating material is substantially free of water-soluble binding agents. In another embodiment, the coating material is substantially free of water. In another embodiment, the coating material comprises no more than 10% water by weight. An exemplary water-soluble polymer is Elvanol® 71-30, a polyvinyl alcohol produced by DuPont Packaging and Industrial Polymers (Wilmington, Del.), which is reported to have an unplasticized Shore hardness greater than 100 (i.e., too hard to be measured on the Shore A scale).

The pigment that masks the black color of the activated carbon need not be uniformly distributed in the coating on the activated carbon particles. In one embodiment, the pigment is selectively distributed toward an interface in the coating, either toward the coating-particle interface or toward the coating-air interface (the outer surface of the coated particle). For example, the particle either before or after coating with a deformable material can be dusted or sprayed with a pigment, or otherwise treated to have a pigment at the surface in question. In one embodiment, a liquid solution is sprayed on the particle which subsequently reacts to form an opaque pigment. For example, in one embodiment, the activated carbon material is given a light color through the use of organo-metallic esters which can react to yield opaque, light-colored metal salts as fine, discrete particles on the surface of the activated carbon material or on the surface of a previously coated activated carbon particle. Other coloring agents such as blue lake compounds can also be present. Exemplary organo-metallic esters compounds that can react to form useful pigments include transition metal alcoxides derived from simple alcohols of transition elements such as titanium and zirconium. These materials are commercially available and have the general formula M(OR), where M is a metal, R is an organic group and x is a coefficient equal to the valence of the metal atom. For the preferred metals of zirconium and titanium, x is 4. The alcoxides are liquids or solids that can be distilled or sublimed and are readily soluble in both polar and non-polar organic solvents. They are generally prepared by the reaction of the metal chlorides with the corresponding alcohol in the presence of a hydrogen halide acceptor such as ammonia. The metal alcoxides can undergo ester exchange reactions with other alcohols. The alcoxides often exist as polymers (trimers or tetramers particularly) with bridging —OR groups. The initial alcoxide is essentially water free.

Alcoxides typically can undergo hydrolysis in the presence of small amounts of moisture. Ease of hydrolysis is inversely proportional to the chain length and bulkiness of the R groups. Hydrolysis yields the free alcohol plus the metal oxide as shown below for titanium isopropoxide:

$$Ti[OCH(CH_3)_2]_4 + 2H_2O \rightarrow TiO_2 + 4CH_3CH_2OHCH_3$$

The hydrolysis is rapid but only mildly exothermic. Premature contact of the alcoxide with water should be prevented to avoid hydrolysis.

To apply the alcoxide to the substrate, use of a spray or mist is preferred. The spray should be fine enough that the resulting opaque particles have substantial porosity to permit gaseous diffusion to the underlying activated carbon material. For best performance, one may apply routine optimization of both the concentration of the alcoxide in a non-aqueous carrier fluid (e.g., a volatile solvent) and of the drop size distribution and means of application. Application means include all known spray technologies and other techniques known in the art. The amount of titanium dioxide or other solids present in the coating material derived from metal alcoxides can less than 100% of the mass of the activated carbon material itself, specifically less than 50%, more specifically less than 20%, and more specifically still less than 10%, with illustrative ranges of 0.5% to 12% by weight or 1% to 5% by weight.

The water-free alcoxide solution may be applied onto the activated carbon material in an environment having sufficient moisture in the air to cause precipitation, resulting in discrete particles on the surface of the substrate. The air can have a relative humidity of at least 40%, more specifically at least 50%, and more specifically still at least about 60%, with characteristic ranges of from about 40% to about 100%, or from about 50% to about 90%. Elevated temperatures (e.g., about 60° C. or about 70° C. or even higher in commercial equipment) may be used to promote the speed of precipitation of the particles. The material to which the alcoxide will be applied can be substantially free of water to prevent premature hydrolysis.

Other reactive means may be possible to apply pigments onto activated carbon fibers. For example, one can spray a first solution on the exposed surface of the fibers and then apply a second solution or a separate second treatment, causing a precipitate to form that is a reaction product of the first solution with the second solution or treatment. For example, a spray of a soluble salt of calcium, zinc, or magnesium could be applied to create droplets on the exposed surface of the activated carbon material, followed by application of an ammonium salt also as a spray or mist to form an opaque precipitate.

EXAMPLES

Example 1

A Wurster 4-inch/6-inch Fluid Bed Coater at the Coating Place, Inc., in Verona, Wis., was used. The device is similar to that of FIG. 1B but tapers upward from a 4-inch diameter at the base to a 6-inch diameter at the top of the main chamber, with another expanded zone above that. The unit has a perforated plate at the bottom serving as the distributor plate. The spray nozzle is mounted at the center of the chamber. The nozzle is a Type 28/50/70 nozzle made by Spraying Systems Co. (Wheaton, Ill.), available as Setup SU2, comprising a PF2850 fluid cap and a PA70 air cap. The activated carbon is placed in the chamber and the air flow is adjusted so that the material is fluidized. An airflow of 35 SCFM was used. The coating liquor was introduced through the nozzle and was atomized by air flowing at about 1.1 SCFM. The activated carbon particles received a small amount of coating as they passed through the spray. The coated particles dried as they rose in the chamber. Then they entered an expansion chamber, where the flow expands and slows, allowing the coated, activated carbon particles to fall out of airstream and return to the coating chamber. In this region, the activated carbon particles were fluidized and received more coating. The level of coating add-on could be adjusted by retention time, coating concentration, and air flow rate.

The activated carbon comprised two commercial varieties. The first kind, hereafter labeled "Type A," was product OL 20×50 available from Calgon Carbon, Inc. (Pittsburgh, Pa.). The designation "20×50" means that the particles are sized between 20 and 50 mesh (from 300 to 840 microns). The second kind of activated carbon, hereafter labeled "Type B," was a citric-acid-impregnated carbon, product RVCA35 12×20, also from Calgon Carbon, Inc. Particle size for Type B is between about 840 to about 1680 microns (between 12 and 20 mesh). Unless otherwise stated, the activated carbon used for the following Examples was Type A.

The binding agent was Dow Corning® 84 Additive (Dow Corning Corporation, Midland, Mich.), an anionic silicone latex, which is said to be capable of forming a porous elastomeric film. Dow Corning® 84 Additive is cured by simple evaporation of water at room temperature, but evaporation can be accelerated by elevation of the temperature. According to manufacturer product information, the emulsion has a viscosity of 500 centipoise, a specific gravity of 1.10, and a pH of 11, and a cured film cured at 50% RH for 14 days at 22° C. has a Shore A hardness of 45 (Dow Corning Corporate Test Method 0099) and a tensile strength of 400 psi (Dow Corning Corporate Test Method 137A).

Dow Corning® 84 Additive is believed to contain hydroxy-terminated dimethyl siloxane, amorphous fumed silica, aminomethylpropanol, dimethylcyclosiloxanes in an aqueous emulsion. It has a solids content of about 62%. The silicone binding agent was combined with pigment to mask the black color of activated carbon. Titanium dioxide was used as a pigment. The product used was KEMIRA® UDR-P aqueous dispersion of titanium dioxide having 72% solids, available from Kerr-McGee Chemical Corporation (Oklahoma City, Okla.).

A white coating liquor was produced by combining 542 grams of the titanium dioxide slurry and 339 grams of the Dow Corning 84 Additive with 2119 grams of distilled water. The combination was mixed with an electric mixer to yield a dispersed solution having 20% solids.

To coat the activated carbon with the liquor, 300 grams of commercial activated carbon were placed into the Wurster Fluid Bed Coater. The inlet air temperature was brought to 165° F. The titanium dioxide/silicone emulsion mixture at room temperature was sprayed into the fluidized bed at a flow rate of about 15 grams per minute. The exit temperature was about 100° F.

Coating add-on levels ranged from 20% to 200% on several runs. The black color of the activated carbon was partially masked by the coating, which appeared to be distributed uniformly on the surface of the particles. However, even at 200% add-on, a grayish color was evident in the coated particles. The material with the 200% add-on was labeled as Sample 4A7.

Example 2

Particles were coated as In Example 1, but were colored blue. 24 grams of Blue Lake colorant from Colorcon (415 Moyer Blvd., West Point, Pa.) was added to 3000 grams of white coating liquor. With the blue pigment present, no grayness was evident in the coated particles. The black color of the activated carbon appeared to be effectively masked at add on levels of about 17% and higher.

Example 3

Green coated activated carbon particles were prepared as in Example 2, but using a green lake pigment, also from Colorcon. Effective masking of the black color was achieved at add-on levels as low as 20%.

Example 4

A white coated activated carbon sample, labeled Sample 3A, was prepared substantially according to Example 1 but with a different white coating liquor. The coating liquor was prepared from 90 grams of RL-100, a methacrylate-based polymer used in time-released coatings of drugs (Rohm America, Inc., Piscataway, N.J.) and 10 grams polyethylene glycol (PEG) dissolved in 900 grams of solvent (a 50/50 blend of methanol/acetone). 100 grams of the titanium dioxide slurry was added to the solution and dispersed therein with an air mixer.

200 grams of activated carbon particles were placed in the Wurster Fluid Bed Coater of Example 1. The activated carbon was fluidized in the bed at an air flow of 35 SCFM. The inlet temperature is brought to 132° F. The coating slurry was sprayed into the chamber at 24 grams/min. Exit temperature was about 102° F. Sample 3A had a 51% coating add-on.

Example 5

Sample 4A7 from Example 1 was coated a second time in the Wurster Fluid Bed Coater using the blue coating liquor of Example 2, providing an additional 12% add-on of blue coating material. The resulting material has a light blue shade and is labeled as Sample 4B.

Example 6

The activated carbon particles of Example 1 were coated in the Wurster Fluid Bed Coater using only the blue coating liquor of Example 2 (unlike Example 5, no coating of white liquor was applied). Add-on levels of 17% and 25% of blue coating material both yielded a distinct blue color to the particles. Particles with the 25% add-on level were labeled Sample 5A2.

Example 7

The blue material, Sample 5A2 of Example 6, was coated again with the white coating liquor of Example 1 provided at an additional add-on level of 47%. The material displayed a light blue shade and was labeled Sample 7A.

Example 8

Adsorption of five odoriferous agents, ammonia, trimethylamine (TMA), triethylamine (TEA), dimethyl disulfide (DMDS) and isovaleric acid (IVA) were tested with the previously described headspace GC method to compare the odor adsorption capacity of untreated activated carbon with that of coated activated carbon from several of the above Examples. The results are reported in Table 2 for each odoriferous chemical as mg of the chemical adsorbed per gram of adsorbent (including mass of the coating).

TABLE 2

Headspace GC Results:
Milligrams of Adsorbate per Gram of Adsorbent
(Coated or Uncoated Activated Carbon).

| Sample | NH3 mg/g | TMA mg/g | TEA mg/g | DMDS mg/g | IVA mg/g |
|---|---|---|---|---|---|
| Uncoated | 30 | 116 | 139 | 140 | 96 |
| 3A | NA | 6 | 6 | 54 | NA |
| 4A7 | 2 | 40 | 104 | 116 | NA |
| 4B | 0 | 36 | 103 | 118 | 65 |
| 5A2 | 26 | 104 | 139 | 138 | 95 |
| 7A | 8 | 60 | 124 | 129 | 68 |

The results for Sample 5A2, coated with a blue coating material at about 25% coating add-on, showed unexpectedly high adsorption. Although the coating appeared to be uniformly distributed over the particle surface and was expected to provide a mass transfer barrier to adsorption, the odoriferous agents were adsorbed by this coated sample almost as well as by the uncoated control. The coated activated carbon of Sample 5A2 showed adsorption efficiencies of over 86% for ammonia, 89% for TMA, 99% for TEA, 98% for DMDS, and 98% for IVA.

The data also show that activated carbon itself did not adsorb NH3 odor effectively. Citric acid impregnated activated carbon, also available from Calgon (Pittsburgh, Pa.) can be expected to offer improved ammonia adsorption.

Figure 4:
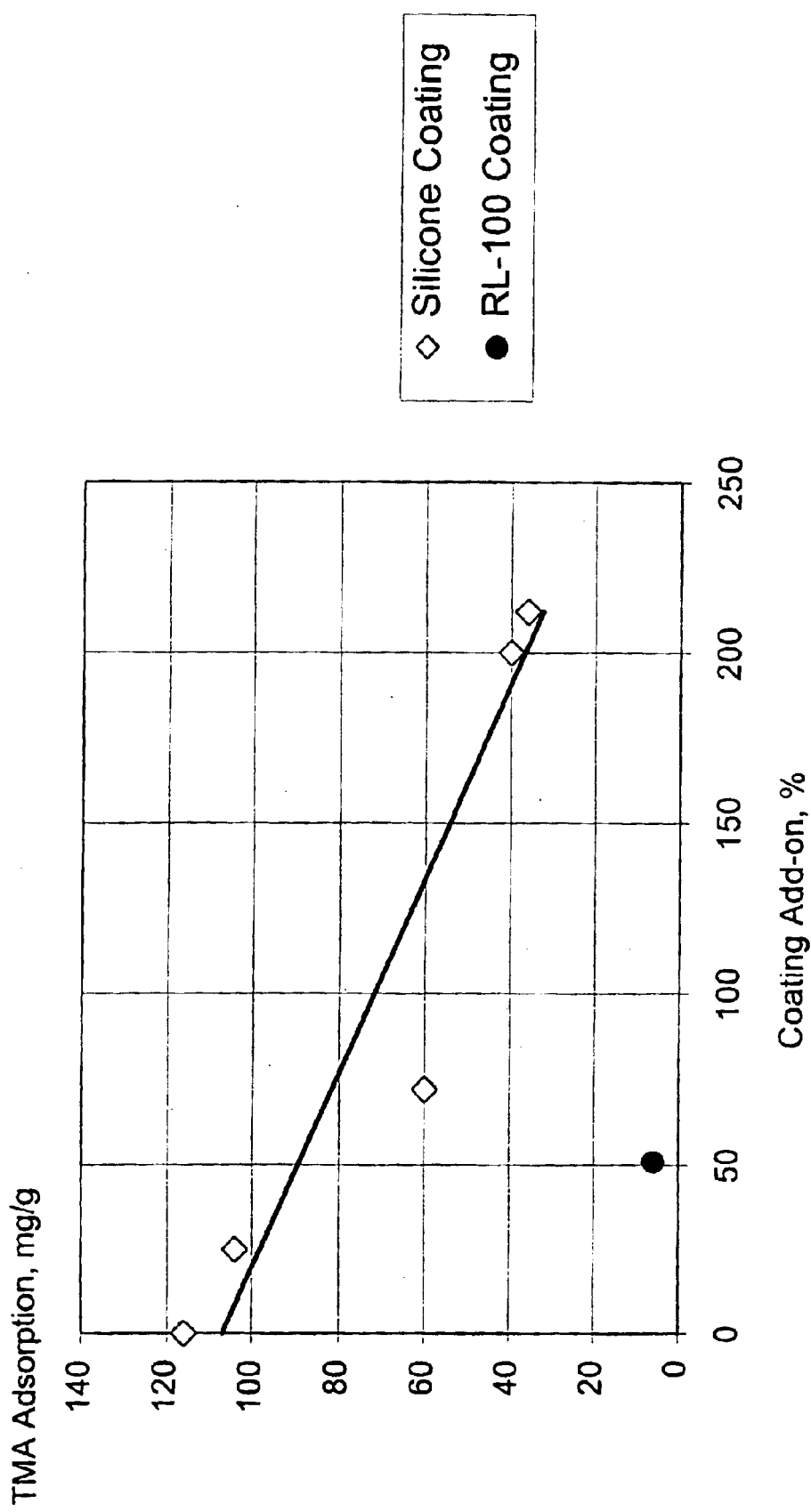
FIG. 4 is a plot showing TMA adsorption by coated activated carbon particles as a function of coating add-on weight percent for particles having a silicone coating and a substantially non-deformable coating.
Figure 5:
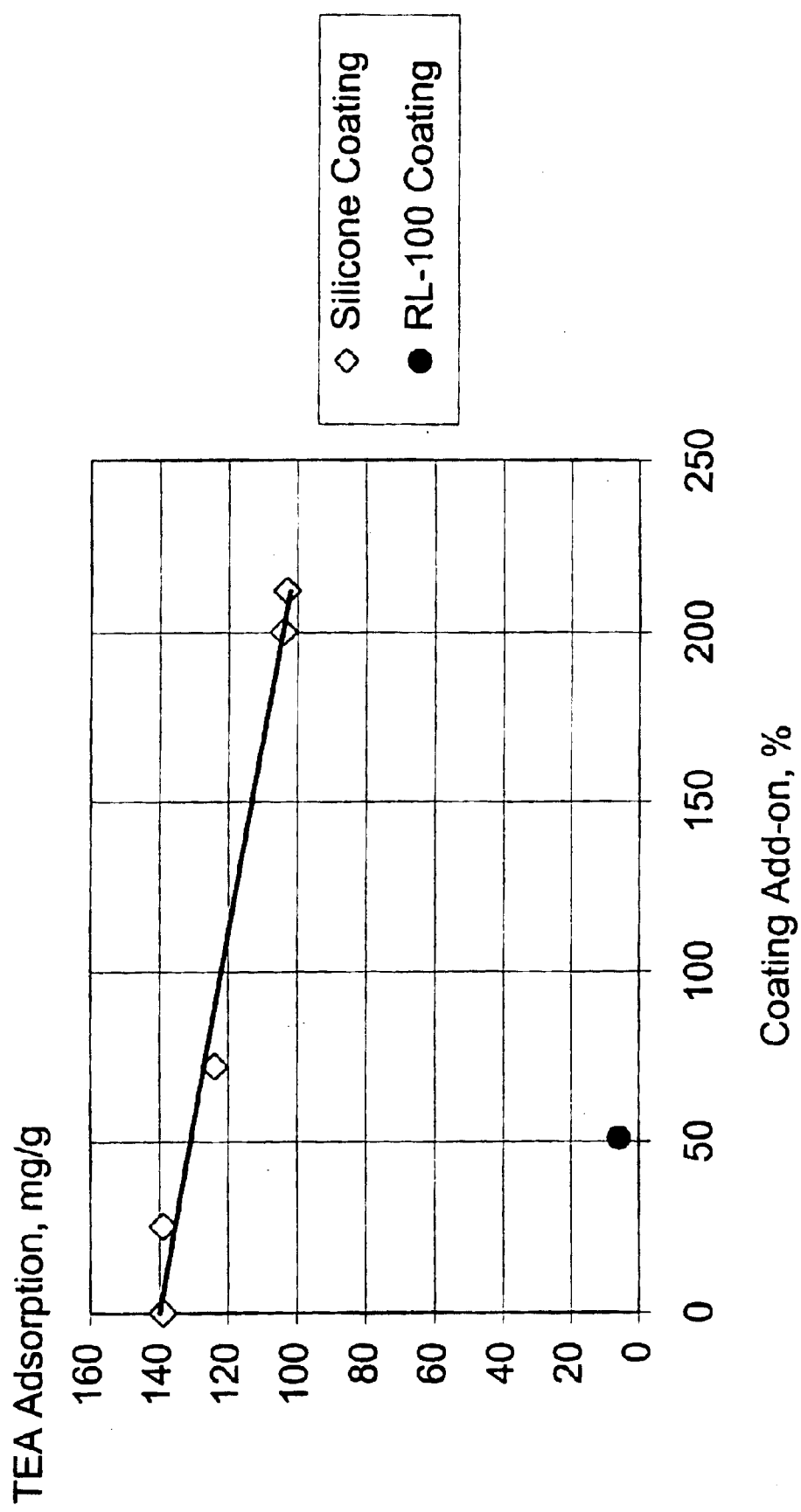
FIG. 5 is a plot showing TEA adsorption by coated activated carbon particles as a function of coating add-on weight percent for particles having a silicone coating and a substantially non-deformable coating.
Figure 6:
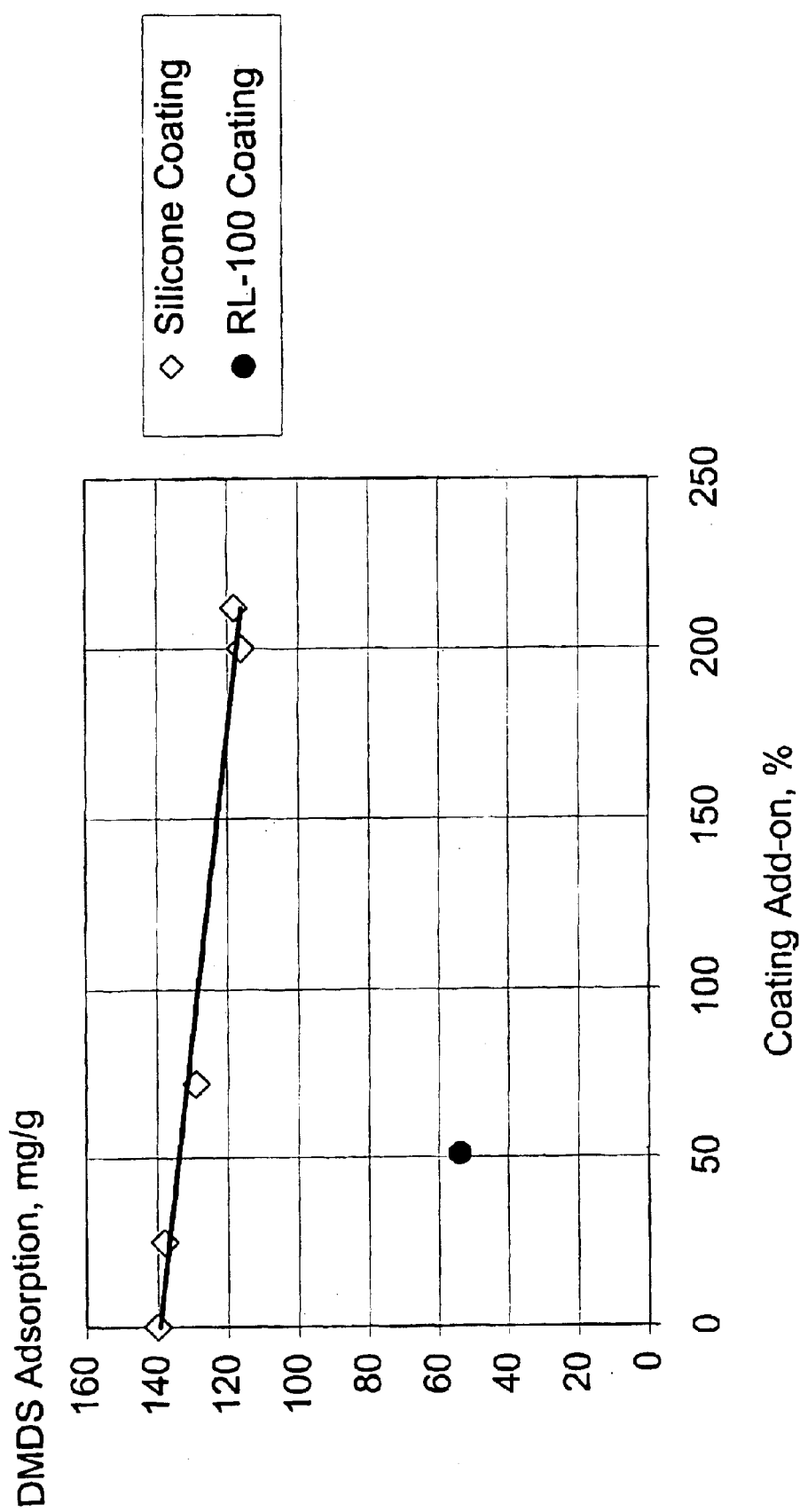
FIG. 6 is a plot showing DMDS adsorption by coated activated carbon particles as a function of coating add-on weight percent for particles having a silicone coating and a substantially non-deformable coating.

FIG. 4 is a plot of the TMA adsorption results versus coating add-on level for the samples listed in Table 2, again showing the superior performance of silicone versus the RL-100 coating, which is water insoluble and substantially non-deformable relative to silicone. FIG. 5 is a similar plot for TEA adsorption, and FIG. 6 is a similar plot for DMDS adsorption. All show superiority of silicone as a coating.

Example 9

Several coated activated carbon samples were tested for PNL values, with results reported in Table 3 below. Several of the samples in Table 3 consisted of blue silicone-coated particles made according to Example 2, comprising the Type A or Type B activated carbon particles of Example 1. Sample KK used a water-soluble polyvinyl alcohol binder (PVOH), specifically Elvanol® 90-50, provided by DuPont Packaging and Industrial Polymers (Wilmington, Del.) instead of silicone, and had a solids add-on level of 25%. Another water-soluble binder, hydroxypropylmethylcellulose, obtained as Methocell® E5 from Dow Chemical (Midland, Mich.), was used instead of silicone in Sample MM. As with the blue silicone-based coating materials, the PVOH-based or HPMC-based coating materials comprised about 33.5 weight percent of the binding agent, about 62.5 weight percent of the masking agent ($TiO_2$), and about 4 weight percent of the blue colorant. Sample LL used a fine zeolite, Zeolyst® CBV 400 made by Zeolyst International (Valley Forge, Pa.) instead of $TiO_2$ as the masking agent, otherwise was the same as Sample MM. For Sample E, no $TiO_2$ was present, only PVOH (93.4 wt %) and blue pigment (6.7 wt %). (Without the opacifying agent, $TiO_2$, Sample E appeared black in spite of the blue pigment present.) Sample FF had silicone only in the coating material, with no opacifying agent or pigment.

Samples MM, KK, and E all employ the fine activated carbon particles of Type A, but differ in having coatings of HPMC (MM) or PVOH (KK and E). The lower noise in MM can be explained by the higher degree of flocking that occurred in Samples E and KK, where the binder appears to have formed clumps of larger particles bonded with the brittle binder; the clumps having a "crisp," porous nature that promotes higher sound levels.

The untreated Type A activated carbon had a lower PNL than any of the treated activated carbon samples, but this was apparently due to removal of fine particles during treatment. The untreated activated carbon of Type A clearly had a large fines fraction that caused black dust to be suspended in the air during pouring, unlike the more uniformly sized treated particles. The fine particle fraction is believed to reduce the noise level. The untreated Type B activated carbon, with its coarser particle size, had very relatively little fines and yielded a noise level higher than the treated Type B samples (PP and II), both of which are represented with two runs. Sample PP had a water soluble binding agent (polyvinyl alcohol) while Sample II had a silicone binding agent. There is some scatter for each of the two separate series of PNL measurements for these particles, but it appears that at least 5 decibels separates separate the PNL values for the two samples (in fact, the difference between the PP-2 and II-2 runs was 11 decibels). The difference between the silicone treated Type B particles and the untreated Type B particles (Sample II) appears to be at least 13 decibels. The improvement in noise reduction for coated activated carbon particles is expected to be a strong function of particle size, with larger particles shower a greater reduction in PNL due to coating with a deformable binding agent.

TABLE 3

Particle Noise Levels for coated and uncoated particles.

| Sample | Coating Material | Add-on | Particle Type | Mean | St. Dev. |
|---|---|---|---|---|---|
| KK | PVOH + $TiO_2$ + blue lake | 25% | A | 53.66 | 0.996 |
| E | PVOH + blue lake | 10% | A | 54.42 | 0.701 |
| FF | DC84 only | 60% | A | 49.26 | 1.064 |
| E-2 | PVOH + blue lake | 10% | A | 53.04 | 0.428 |

TABLE 3-continued

Particle Noise Levels for coated and uncoated particles.

| Sample | Coating Material | Add-on | Particle Type | Mean | St. Dev. |
|---|---|---|---|---|---|
| PP | PVOH + $TiO_2$ + blue lake | 25% | B | 59.44 | 0.921 |
| PP-2 | PVOH + $TiO_2$ + blue lake | 25% | B | 62.0 | 1.773 |
| MM | HPMC + $TiO_2$ + blue lake | 25% | A | 48.06 | 0.537 |
| GG | DC84 + $TiO_2$ + blue lake | 25% | A | 46.18 | 1.114 |
| LL | HPMC + zeolite + blue lake | 25% | A | 48.62 | 0.303 |
| II | DC84 + $TiO_2$ + blue lake | 25% | B | 54.34 | 0.472 |
| II-2 | DC84 + $TiO_2$ + blue lake | 25% | B | 51.0 | 1.064 |
| 4B | DC84 + $TiO_2$ + blue lake | 212% | A | 48.3 | 0.688 |
| Untreated | None | 0% | B | 67.9 | 1.17 |
| Untreated | None | 0% | A | 46.04 | 0.568 |

Example 10

To illustrate some of the color properties obtained with samples made according to the present invention, several coated activated carbon particles were measured for L-a-b values, as described above. Results are in Table 4. Due to limited quantities available, measurements with sample 7A1 was conducted with about 10 cc of material spread in a circle large enough to cover the measurement area of the instrument. The pigments were measured while in a transparent plastic bag pressed against the light aperture of the device. Sample 4A7 was a slightly gray sample coated with titanium dioxide as the only pigment (no colored pigments). The same applied to Sample 3A, which had a blue-gray appearance. The bluish tinge to sample 3A is reflected in the "b" value of −4.88.

TABLE 4

L-a-b values for treated activated carbon particles and pigments.

| Sample | L | a | b |
|---|---|---|---|
| 4B | 52.62 | −11.82 | −31.34 |
| 4A7 | 62.84 | −1.08 | −1.15 |
| 3A | 61.42 | −0.76 | −4.88 |
| 7A1 | 72.98 | −7.6 | −12.66 |
| GG | 49.03 | −10.56 | −24.53 |
| LL | 41.5 | −9.23 | −17.75 |
| D | 43.95 | −14.46 | 7.39 |
| PP | 41 | −9.43 | −18.93 |
| E | 14.03 | −0.51 | −1.63 |
| Untreated Type B | 13.90 | 0.12 | 0.39 |
| Blue pigment | 30.56 | 2.76 | −48.73 |
| Green pigment | 40.38 | −21.84 | 6.93 |

It will be appreciated that the foregoing examples, given for purposes of illustration, are not to be construed as limiting the scope of this invention, which is defined by the following claims and all equivalents thereto. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be proposed that do not achieve all of the advantages of some embodiments, yet the absence of a particular advantage shall not be construed to necessarily mean that such an embodiment is outside the scope of the present invention.

We claim:

1. Coated activated carbon comprising activated carbon particles coated with a water-insoluble coating material effective to mask a color of the activated carbon particles, the coating material including a masking agent and a water-insoluble binding agent effective to bind the masking agent to the activated carbon particles, the coating material having an add-on level relative to the uncoated activated carbon of at least 5%, and the coated activated carbon particles having a Relative Adsorption Efficiency with respect to at least one odoriferous agent of at least 30%, the odoriferous agent being selected from the group comprising ammonia, triethylamine, trimethylamine; dimethyldisulphide; and isovaleric acid.

2. The coated activated carbon of claim 1, wherein the Relative Adsorption Efficiency is at least 50%.

3. The coated activated carbon of claim 1, wherein the Relative Adsorption Efficiency is at least 70%.

4. The coated activated carbon of claim 1, wherein the Relative Adsorption Efficiency is at least 90%.

5. The coated activated carbon of claim 1, wherein the binding agent is deformable.

6. The coated activated carbon of claim 1, wherein the coating material is colored.

7. The coated activated carbon of claim 1, wherein the coating material is opaque and is not white or gray.

8. The coated activated carbon of claim 1, further having a Particulate Noise Level at least 2 decibels lower than that of the uncoated activated carbon.

9. The coated activated carbon of claim 1, further having a Particulate Noise Level at least 4 decibels lower than that of the uncoated activated carbon.

10. The coated activated carbon of claim 1, further having a Particulate Noise Level at least 6 decibels lower than that of the uncoated activated carbon.

11. The coated activated carbon of claim 1, further having a Particulate Noise Level of about 52 or less.

12. The coated activated carbon of claim 1, further having a Particulate Noise Level of about 50 or less.

13. The coated activated carbon of claim 1, wherein the binding agent is hydrophobic.

14. The coated activated carbon of claim 1, wherein the binding agent comprises a latex.

15. The coated activated carbon of claim 1, wherein the binding agent is formed from a compound comprising a latex.

16. The coated activated carbon of claim 1, wherein the coating material is formed from a process comprising combination of a binding agent, a pigment, and a blowing agent.

17. The coated activated carbon of claim 1, further comprising a fluoropolymer.

18. The coated activated carbon of claim 1, wherein the masking agent is more concentrated at an outer surface of the coating material than at an inner surface of the coating material.

19. The coated activated carbon of claim 1, wherein the masking agent is more concentrated at the inner surface of the coating material than at the outer surface of the coating material.

20. The coated activated carbon of claim 1, wherein the masking agent comprises metal oxides formed by reaction of a metal alcoxide.

21. The coated activated carbon of claim 2 or 4, wherein the odoriferous agent is ammonia.

22. The coated activated carbon of claim 2 or 4, wherein the odoriferous agent is trimethylamine.

23. The coated activated carbon of claim 2 or 4, wherein the odoriferous agent is dimethyldisulfide.

24. The coated activated carbon of claim 5, wherein the coating material has a Shore A hardness of less than about 70.

25. The coated activated carbon of claim 5, wherein the coating material has a Shore A hardness of less than about 50.

26. The coated activated carbon of claim 6, further having a HunterLab L value of at least 40 and an absolute "a" value or absolute "b" value greater than 10.

27. Coated activated carbon comprising granular activated carbon coated with a colored coating material, the colored coating material including a colored masking agent and a water-insoluble binding agent effective to bind the colored masking agent to the granular activated carbon, the coated activated carbon having a HunterLab L value of at least 40 and an absolute "a" value or absolute "b" value greater than 10.

28. The coated activated carbon of claim 27, wherein the binding agent comprises a silicone compound.

29. The coated activated carbon of claim 27, wherein the binding agent comprises a latex.

30. The coated activated carbon of claim 27, wherein the binding agent has a Shore A hardness of about 70 or less.

31. The coated activated carbon of claim 27, wherein the binding agent has a Shore A hardness of about 50 or less.

32. The coated activated carbon of claim 27, wherein the binding agent has a Shore A hardness of about 40 or less.

33. The coated activated carbon of claim 27, wherein the binding agent has a Shore A hardness of about 35 or less.

34. The coated activated carbon of claim 27, wherein the coating material comprises an elastomer.

35. The coated activated carbon of claim 27, wherein the masking agent comprises a white powder.

36. The coated activated carbon of claim 35, wherein the masking agent comprises titanium dioxide.

37. The coated activated carbon of claim 27 or 35, wherein the masking agent comprises a colored pigment.

38. The coated activated carbon of claim 27, wherein the activated carbon comprises a fibrous form.

39. The coated activated carbon of claim 27, wherein the coating material is porous.

40. An absorbent article comprising the coated activated carbon of claim 27.

41. A face mask comprising the coated activated carbon particles of claim 27.

42. The coated activated carbon of claim 39, wherein the porous coating material is formed by the action of a blowing agent.

43. The absorbent article of claim 42, wherein the article is a sanitary napkin.

44. The absorbent article of claim 42, wherein the article is intended to receive feces.

45. Coated activated carbon comprising activated carbon particles coated with a coating material including a water-insoluble elastomeric binding agent, the coated activated carbon particles having a Relative Efficiency for Adsorption of Ammonia of at least 30%.

46. The coated activated carbon of claim 45, wherein the coating material comprises a non-white pigment.

47. The coated activated carbon of claim 45, wherein the elastomer comprises a silicone.

48. The coated activated carbon of claim 45, wherein the coating material comprising a colored pigment, such that the coated activated carbon has a HunterLab L value of at least 40 and an absolute "a" value or absolute "b" value greater than 10.

49. An absorbent article comprising the coated activated carbon particles of claim 45.

50. A face mask comprising the coated activated carbon particles of claim 45.

51. The absorbent article of claim 49, wherein the article is a sanitary napkin.

52. The absorbent article of claim 49, wherein the article is intended to receive feces.

53. Activated carbon particles coated with a colored coating material, the colored coating material comprising a deformable water-insoluble binding agent having a Shore A hardness of less than 70 and having an absolute HunterLab "a" value or absolute HunterLab "b" value greater than 10.

54. The activated carbon particles of claim 53 having a mean particle size less than 5 mm.

55. The activated carbon particles of claim 54 having a mean particle size less than 2 mm.

56. Activated carbon particles coated with a coating material comprising a water-insoluble binding agent and a pigment effective to mask a color of the activated carbon particles, wherein the color of the coated activated carbon particles is neither white, gray, nor black.

57. The activated carbon particles of claim 56 having a Shore A hardness of about 70 or less.

58. The activated carbon particles of claim 56, wherein the binding agent is formed from a mixture comprising a silicone latex.

59. A composition for removal of an odiferous agent, comprising:

a quantity of activated carbon particles;

a water-insoluble coating material on a surface of the activated carbon particles effective to mask a color of the activated carbon;

the water-insoluble coating material including at least one of an opaque masking agent and a colored masking agent and a water-insoluble binding agent that binds the masking agent to the surface of the activated carbon particles;

wherein the composition has a Relative Adsorption Efficiency with respect to at least one odoriferous agent of at least 30%, the odoriferous agent being selected from a group comprising ammonia, triethylamine, trimethylamine, dimethyldisulphide, and isovaleric acid.

60. The composition of claim 59, wherein the binding agent includes an elastomer.

61. The composition of claim 59, wherein the binding agent includes a polymer selected from a group consisting of latex, a silicone compound, and combinations thereof.

62. The composition of claim 59, wherein the coating material includes a blowing agent.

63. The composition of claim 59, wherein the coating material is porous.

* * * * *